US007024387B1

(12) United States Patent
Nieboer et al.

(10) Patent No.: US 7,024,387 B1
(45) Date of Patent: *Apr. 4, 2006

(54) AUTOMATED SYSTEM FOR CONDITIONAL ORDER TRANSACTIONS IN SECURITIES OR OTHER ITEMS IN COMMERCE

(76) Inventors: Robert Scott Nieboer, 217 Lynwood Ter., Nashville, TN (US) 37205; Pedro V. Balcarce, 1617 Maple Timber Ct., Antioch, TN (US) 37013; Ivan N. Zhidov, 3721 Hillbrook Ct., Nashville, TN (US) 37211; Micah James Eldred, 510 Old Hickory Blvd., Apt. 1117, Nashville, TN (US) 37209

( * ) Notice: Subject to any disclaimer, the term of this patent is extended or adjusted under 35 U.S.C. 154(b) by 665 days.

This patent is subject to a terminal disclaimer.

(21) Appl. No.: 09/695,828

(22) Filed: Oct. 26, 2000

Related U.S. Application Data

(63) Continuation-in-part of application No. 09/359,686, filed on Jul. 23, 1999, now Pat. No. 6,418,419, and a continuation of application No. PCT/US00/19567, filed on Jul. 24, 2000.

(51) Int. Cl.
*G06F 17/60* (2006.01)

(52) U.S. Cl. .............................. 705/37; 705/26; 705/27
(58) Field of Classification Search ................. 705/26, 705/27, 37

See application file for complete search history.

(56) References Cited

U.S. PATENT DOCUMENTS 5,136,501 A * 8/1992 Silverman et al. ............. 705/37
5,168,446 A * 12/1992 Wiseman ....................... 705/37

(Continued)

FOREIGN PATENT DOCUMENTS

EP 0 401 203 * 12/1990
EP 0 411 748 * 6/1991

OTHER PUBLICATIONS

Lee, Charles M.C.; "Market Integration and price execution for NYSE–listed securities," Journal of Finance, v48, n3, p1009(30), Jul. 1993.*
Kull et al.; "The house of games," Computer Decisions, v20, n8, p43(11), Aug. 1988.*
"State Street BSE: State Street and the Boston Stock Exchange Announce Exclusive Agreement," Business Wire, BW1247, Aug. 1, 1998.*

*Primary Examiner*—Wynn W. Coggins
*Assistant Examiner*—Forest Thompson
(74) *Attorney, Agent, or Firm*—Anthony Laws Birch

(57) ABSTRACT

An apparatus and method of automatically and anonymously buying and selling positions in fungible properties between subscribers. The specific embodiment described in the disclosure relates to the buying and selling of securities or contracts where the offer to purchase or sell the property may be conditioned upon factors such as the ability to purchase or sell other property or the actual purchase or sale of other property. Specifically, the system described includes methods by which the system will sort and display the information available on each order, methods by which the system will match buy and sell order and attempt to use other markets to effect the execution of transactions without violating conditions set by the subscriber, methods by which the apparatus will execute transaction and report prices to third parties such that the user is satisfied and short sales are reported as prescribed by the rules and regulations of the appropriate regulatory body governing each subscriber in the associated transaction. A communication system is described which allows subscribers to communicate anonymously for the purpose of effecting transactions in such property under such conditions.

12 Claims, 10 Drawing Sheets

U.S. PATENT DOCUMENTS

| | | | |
|---|---|---|---|
| 5,809,483 A | * | 9/1998 | Broka et al. .................. 705/37 |
| 5,873,071 A | * | 2/1999 | Ferstenberg et al. .......... 705/37 |
| 5,924,082 A | * | 7/1999 | Silverman et al. ............ 705/37 |
| 5,924,083 A | * | 7/1999 | Silverman et al. ............ 705/37 |
| 5,950,178 A | * | 9/1999 | Borgato ....................... 705/37 |
| 5,963,923 A | * | 10/1999 | Garber ......................... 705/37 |
| 5,999,918 A | * | 12/1999 | Williams et al. .............. 705/36 |
| 6,016,482 A | * | 1/2000 | Molinari et al. .............. 705/35 |
| 6,134,536 A | * | 10/2000 | Shepherd ..................... 705/37 |
| 6,418,419 B1 | * | 7/2002 | Nieboer et al. ............... 705/37 |

* cited by examiner

FIG.5
FIG.6
FIG.7
FIG.8

QUICK ORDER ENTRY / TRADE REPORTS

SOFT KEYS FOR WILD CARD AREA DISPLAY

MARKET MONITOR

```
                    YELLOW              YELLOW                YELLOW
   12:16  [LODG.RA] . B  200M/103^2 v 22a7 ...[SPLS.AA] .S 400M 129  v  49^1
   02:17  [ SPLS.AA ] . B  250M  125 v  47^3 ...[ RXT.AA] .T 750M  113.24  v  21b13
   02:19  [ RXT.RA ] . B  500M  112^6  v  21^4 ...[AAPL.RA] .B  85M  102...
   03:21  [ JBNK/WB] . B  5000  1.06s ..[ SPLS.AA] . S  200  127  v  48^2 ...
```

FIG.12                     YELLOW

THE ORDER BOOK AT 3:22 MAY LOOK LIKE:
       YELLOW
| SYM [SPLS.AA] | STAPLES INC. 51/2  5-1-01; 144A; SPLS; RATIO= 28.437 |

LT  48 1/4 + 1/4        48 1/8 - 48 1/4   10 x 5

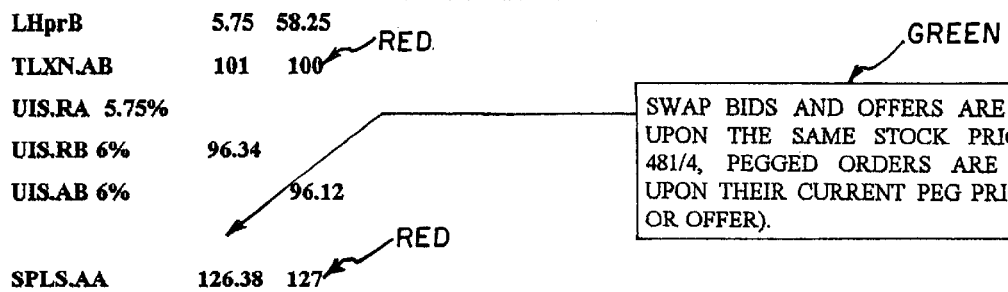

FIG.13  ORDER BOOK SAMPLE

IF THE USER HAD CHOSEN THE "SPREAD" OPTION, THE MARKET
MONITOR AREA WOULD LOOK LIKE THIS:

LHprB       5.75   58.25
                          RED                              GREEN
TLXN.AB     101    100
                                          SWAP BIDS AND OFFERS ARE BASED
UIS.RA 5.75%                              UPON THE SAME STOCK PRICES OF
                                          48 1/4, PEGGED ORDERS ARE BASED
UIS.RB 6%          96.34                  UPON THEIR CURRENT PEG PRICE (BID
                                          OR OFFER).
UIS.AB 6%          96.12
                          RED
SPLS.AA            126.38  127

FIG. 14  MARKET MONITOR SPREAD OPTION

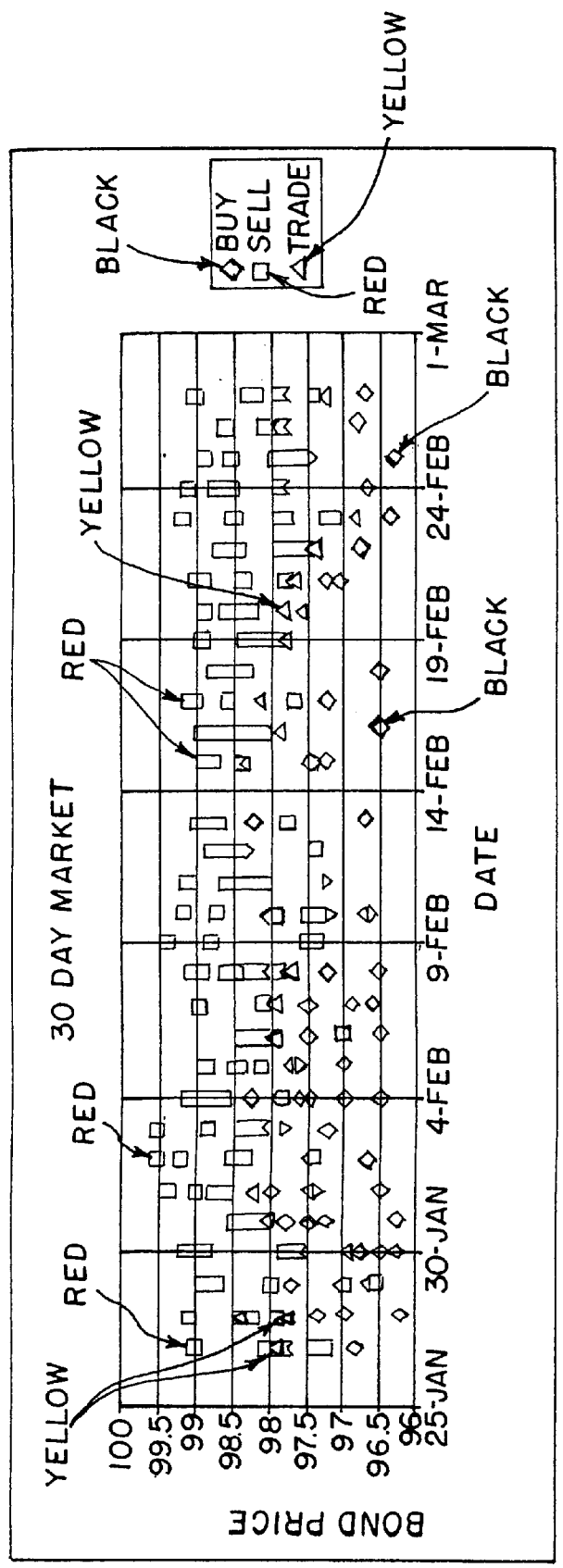
FIG. 15 CONDITIONAL ORDER CHARTS

| | ISSUER | CALL FEATURES | CONVERSION FEATURES |
|---|---|---|---|
| DCOUPON: 7.50% | SHOLODGE, INC | NON-CALLABLE | CONVERSION RATIO 42.9 |
| DFREQ. 2 | 217 WEST MAIN STREET | UNTIL 5/1/97 | CONVERTIBLE UNTIL 5/1/2004 |
| DCOUPTYPE FIXED | | SOFT CALL UNTIL: | CONVERTIBLE INTO: LODG |
| ACCRUAL: 30/60 | GALLITIN, TN 37066 | COMMON TRIGGER: | |
| PAR AMOUNT 1000 | 615-452-7332 | TRIGGER PERIOD: / | CUSIP: 825034AA9 |
| REGISTRATION REGISTERED | TEMP. ISSUED WITH SHORT | FREELY CALLABLE | ISIN: |
| ISSUED: 54000000 | 1ST COUPON | 5/1/97 | SP: B+   MOODY'S  B2 |
| OUTSTANDING 54000000 | | | |
| LEAD MGR: J.C. BRADFORD | | | |
| PERM. 18% PERM | | | |

Table annotated with "TAN" pointing to the table.

FIG.16

AUTOMATED SYSTEM FOR CONDITIONAL ORDER TRANSACTIONS IN SECURITIES OR OTHER ITEMS IN COMMERCE

This applicaiton of continuation-in-part of Ser. No. 09/359,686 filed Feb. 23, 1999 Pat. No. 6,418,419 and a continuation of PCT/US00/19567 filed Jul. 24, 2000.

BACKGROUND OF THE INVENTION

The present invention relates to a system and method for the conditional trading of arbitrary items over one or more electronic networks. More specifically, the present invention relates, in a preferred embodiment, to a method and system for contingency trading of securities such as convertible bond "swaps", risk arbitrage, and pairs in both listed and over-the-counter markets.

There are five types of industry participants generally involved in convertible securities: 1) mutual funds which make decisions to purchase and sell convertibles based upon a) fundamental research relating to the company or the industry, and b) asset allocation and portfolio adjustment decisions; 2) hedge funds which are driven to purchase and sell securities based upon the relative value of the convertible to its underlying stock and other convertibles; 3) large multinational broker-dealers which purchase and sell securities based upon customers' (mutual funds and hedge funds) purchase and sale interest as well as relative value; 4) regional broker-dealers which are driven to purchase and sell securities based upon customers' interest and retail distribution power; and 5) broker's brokers which expose indications of interest between dealers and some hedge funds, who act only as agent and do not position securities. There is no computer network actively linking these participants in a transaction-oriented format. Virtually every transaction is through verbal private negotiations. Almost every bid, offer, or trade is made verbally and is transmitted only to those persons involved in the trade. The present invention will create an auction market instead of a negotiated market and will display prices to all participants and save the information for later use. The present invention is an anonymous system; the current verbal network is neither efficient nor anonymous.

Over the past 15 years electronic order display networks have proliferated in the equity markets. From Nasdaq's ACES system to the very successful Instinet system, the industry has been transformed from a marketplace in which negotiations take place over the phone between two parties to one in which negotiations take place over a computer network among several parties. This phenomena has created a quasi-negotiated/ quasi-auction market in both Nasdaq securities which have, until recently, been primarily negotiation-based and listed securities which have been primarily auction-based. In effect, these networks have provided users with the ability to choose the method of negotiation most befitting their current situation and objectives. Convertible securities markets have not been exploited by these systems to the extent the equity markets have, in part because of the complex nature of "typical" trading practice. Specifically, a large portion of convertible securities presently held in positions are hedged in one form or another and well over 60% of the trading volume is effected with a "contingent" transaction (a transaction in which another security is traded at about the same time). The present invention has developed the framework for a system that satisfies a need in the art, which will exploit this market, and other contingency based markets like risk arbitrage, ADR's, pairs, and eventually, options.

SUMMARY OF THE INVENTION

Accordingly, a primary object of the present invention is to efficiently transact conditional buy and sell orders for items of commerce by multiple traders in real-time.

It is further an object of the present invention to match or negotiate conditional buy and sell orders of the items with reduced transaction costs to the traders.

It is another object of the present invention to rapidly process conditional buy and sell orders of securities such as, convertible bond "swaps", risk arbitrage, and pairs in both listed and over-the-counter markets.

It is still another object of the present invention to provide matching or comparing in accordance with constraints and conditions, algorithmic buy/sell orders with non-algorithmic sell/buy orders through the use of data from, and interaction with, multiple external exchanges.

It is yet another object of the present invention to provide traders improved workstations for entering, viewing, monitoring and changing or deleting conditional buy/sell orders, which reflects changes in the favorability of the orders.

It is still a further object of the present invention to give public access to the persons skilled in security transactions for trading of conditional securities in real-time without the assistance of traditional broker networks.

The objects of the present invention are fulfilled by providing a conditional order transaction network that matches or compares buy and sell orders for a plurality of items based upon conditions set forth within the order, including the price represented as an algorithm with constraints thereon, the conditional order transaction network comprising:

a variable number of trader terminals for entering an order for an item in the form of an algorithm with constraints thereon that represent a willingness to transact, where the price is the dependent variable of the algorithm within the constraints and the price of another item as an independent variable, the algorithm representing a buy or sell order; and at least one computer coupled to each of the trader terminals over a communication network and receiving as inputs, a) each algorithm with its corresponding constraints and b) at least one depicting prices of various items and contracts from external multiple data sources which may be used as variables of the algorithm or an input to a constraint variable, the controller computer comprising, means for matching or comparing, in accordance with the constraints and conditions, algorithmic buy/sell orders with algorithmic or non-algorithmic sell/buy orders through the use of the external multiple data sources.

In a preferred embodiment, the items are security instruments such as stocks, bonds, options, futures, and forward contracts or swap contracts. However, in the broader sense the system and method of the present invention is a conditional trading network for various commodities or items in commerce, including but not limited to cars, airline tickets, energy credits, petroleum products or gaming contracts. The items may be bought or sold outright or may be exchanged for a combination of other items and cash. The number of items and the amount of cash that exchanges hands is determined programmatically in accordance with predefined constraints specified when orders are made and as a product of data originating outside of the system, i.e., external data sources, and provided to it by external agents.

The invention is directed to an automated system for providing financial information, including trading information regarding securities, and conditional order transactional services in real-time to all users. Both are provided via a global computer network. This has the advantages of increasing the efficiencies in the marketplace, substantially reducing transaction costs, and providing equal opportunities to all users.

Subscribers/traders to the network are provided with ongoing financial information. A subscriber can choose certain securities for which he is to be apprised of any relevant activity.

A subscriber can submit a conditional offer to buy/sell. This conditional buy/sell offer is immediately conveyed to all subscribers i.e., there is instant exposure to the market. Other subscribers can accept or counter the offer, with the acceptance or the counter offer being communicated immediately to the original offeror and/or the other subscribers to the system.

The system facilitates contingent or conditional trading. It provides real-time market data and communication links between subscribers. It makes possible the monitoring of securities of various types, the receiving of market data, the entering and executing of orders in an Order Book, the negotiating of trades against other "it orders" in the book and the routing of the orders to various exchanges such as the New York Stock Exchange (NYSE), Nasdaq, American Stock Exchange (AMEX) and the Pacific Stock Exchange (PSE) through such access providers as DOT, ITS or SelectNet. In addition, subscribers to the system may automatically receive confirmations of trade executions, access static data from the financial information database, and analyze securities for potential trades using such data and real-time prices.

The system can be anonymous. Each subscriber can view the Order Book in different ways or input orders to the system using screen or form views which are intuitively different but logically identical, i.e., which present the same substance in different formats. For instance, instead of formatting an offer to purchase an option at a specific price as originally input by a subscriber, another subscriber can customize his network interface to automatically convert the format and display the offer in the form of a volatility offering.

As another example, a first subscriber can make a conditional offer in the format of an offering to purchase security A and sell security B at set prices. A second subscriber may customize his network interface to automatically translate all such conditional offers into a discount amount, i.e., A*ratio—B—discount. The second subscriber might counter offer in his preferred discount format, but the first subscriber can customize his network interface to automatically translate all such conditional offers into his preferred format of "sell A versus buy B at different level."

The objects of the present invention are further fulfilled by providing a trader workstation for trading and negotiating prospective trades for instruments referenced in buy and sell orders, based upon conditions set forth in the orders including the price represented by an algorithm with constraints thereon, comprising;

a display device for displaying the selected parameters of buy and sell orders in a prioritized sequence in a descending order of favorability across a display field, with the most favorable order at one distal end and the least favorable at the other distal end;

an input device for entering outgoing orders to be traded or negotiated into the trader workstation; and a computer for receiving the outgoing orders and incoming order information from traders' workstation, and for controlling the display device, said computer including, a comparator for comparing incoming orders relative to outgoing orders, and a sorter that resequences the orders in real-time in the display field as each order or other information related to the orders is received to reflect changes in the relative favorability of the orders.

The system monitors existing bids/offers for changes in the secondary securities that would cause bids/offers to intersect. The system can automatically execute (i.e., place orders on the secondary security and report the transaction in the primary security) bids/offers when they intersect. To place an order for the secondary security, the system can automatically contact the appropriate Exchange (e.g., New York Stock Exchange/NYSE) to place the bid/offer for the secondary security.

Further scope of the applicability of the present invention will become apparent from the detailed description given hereinafter. However, it should be understood that the detailed description and specific examples, while indicating preferred embodiment of the invention, are given by way of illustration only, since various changes and modification within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 5 is an illustration of the ticker display field portion of the display screen of FIG. 4;

FIG. 6 is an illustration of the security description line on the display screen of FIG. 4;

FIG. 7 is a display field of the active external market data on the display screen of FIG. 4;

FIG. 8 is the Order Book display field portion of the display screen of FIG. 4;

FIG. 12 is an example of a ticker display field on the screen of FIG. 4, with exemplary data thereon;

FIGS. 13 and 14, respectively, are portions of the Order Book displaying the data of FIG. 12 in two respective options, namely, a regular option in FIG. 13, and a spread option in FIG. 14;

FIG. 15 is a chart representing all of the orders input to the system over a selected 30-day period for example; and FIG. 16 is an example of a regular convertible bond description form available to users of the system.

DETAILED DESCRIPTION OF THE PREFERRED EMBODIMENTS

Figure 1:
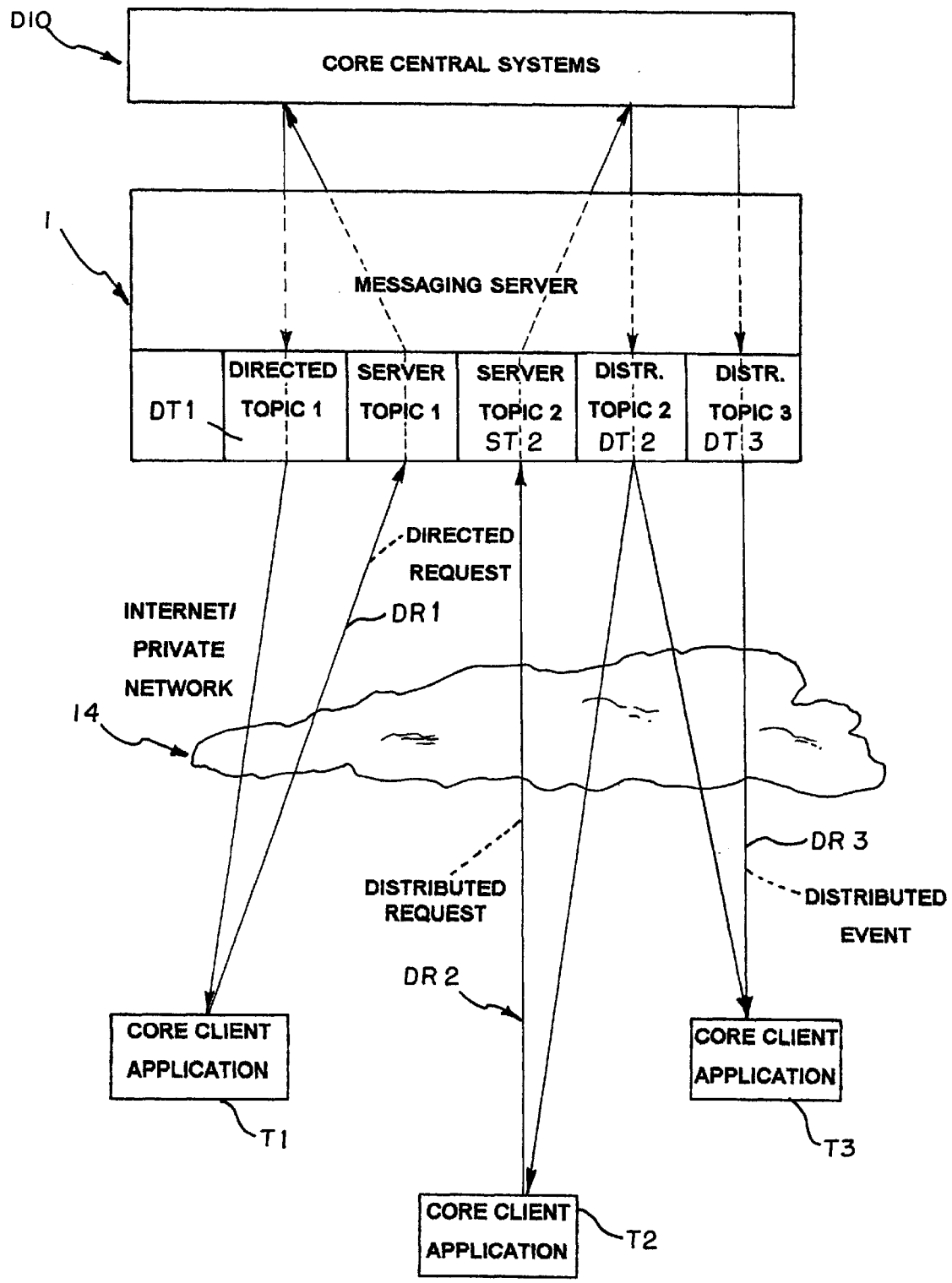
FIG. 1 is a diagrammatic illustration of a conditional order transaction system in accordance with the present invention providing an overview of system operation.

Referring to FIG. 1, there are three scenarios depicted for use of the conditional order routing exchange (hereinafter CORE) of the present invention. The first scenario depicts a client/subscriber/trader request with a directed response. The second shows a client request whose response is disseminated to various interested parties. The third represents data originating outside of the system and distributed to all interested parties.

Directed Response

The CORE client program T1 formats and transmits a message for the system to handle DR1, expecting whatever response is appropriate to be directed only to the initiating program. The message is transmitted via the internet or some virtual network 14 through a messaging server 12, an application charged with delivering messages from one sender to one or more recipients, guaranteeing the delivery of the message, integrity of its contents, and the preservation of the order in which the orders were sent. The message is delivered to the system through a server topic ST1, a messaging server mechanism configured to allow messages to be retrieved by the system exactly once. A collection of server-side application designed to cooperate in the present invention's centralized data processing, i.e. CORE Central Systems 10, a messaging server mechanism configured to allow message to be retrieved by a client exactly once.

Distributed Response

The CORE client program T2 formats and transmits a message for the system to handle DR2, expecting whatever response is appropriate to be distributed to every client program that has expressed interest in this information. The message is transmitted via the Internet or some virtual network 14 through the messaging server 12. The message is delivered to the system through a server topic ST2, guaranteeing it will be processed exactly once. The CORE Central Systems 10 process the client request and distribute any appropriate data through a distributed topic DT2 to any clients that have expressed interest in this data T3, including the originating program T2.

Distributed Event

The CORE Central Systems 10 receive data, from some external source, that needs to be redistributed internally. The system formats and transmits a message, including the external data, through a distributed topic DT3 to any clients that have expressed interest in this data T3. The message DR3 is delivered from the system through the messaging server 12 via the Internet or some virtual network 14.

Figure 2:
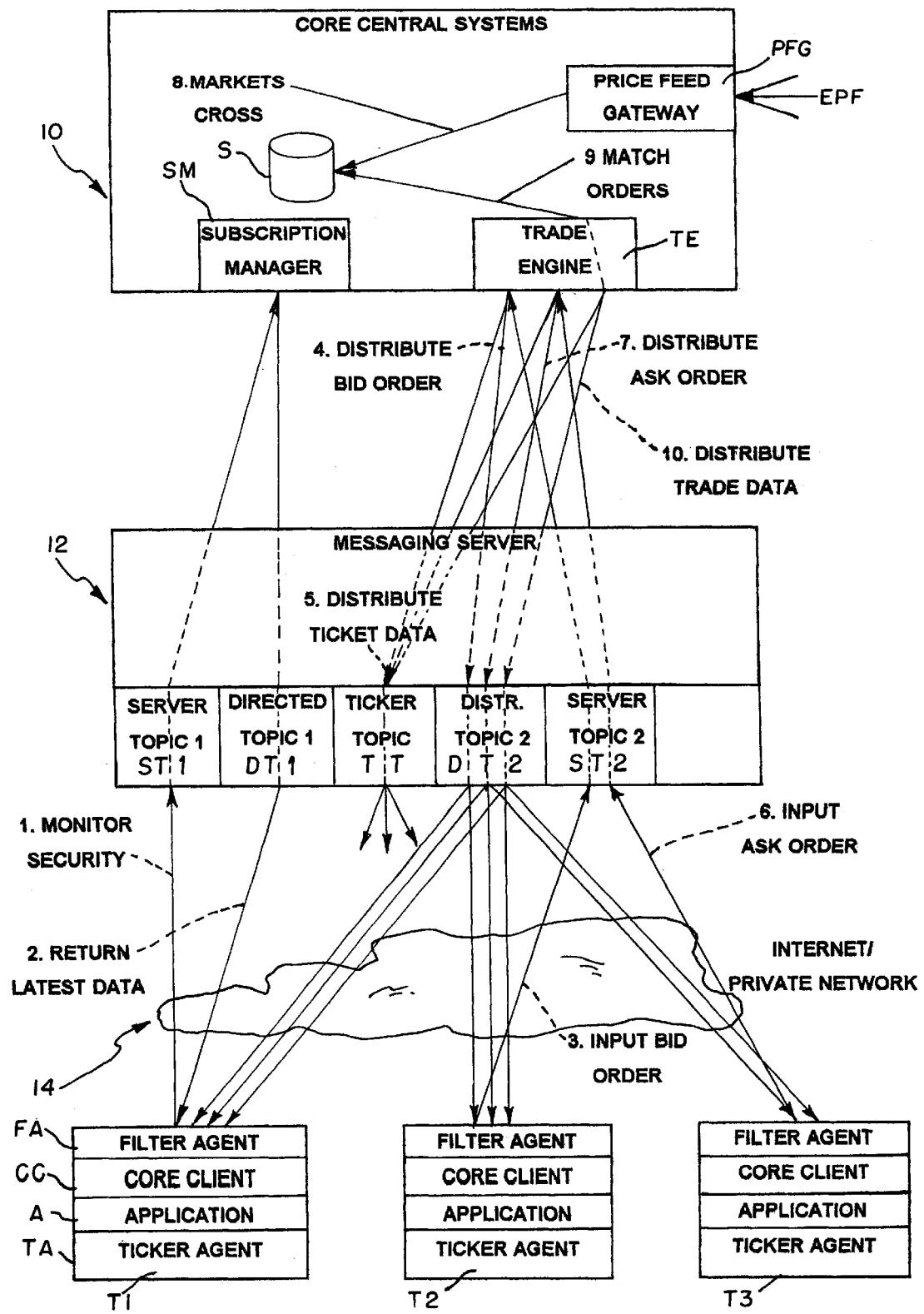
FIG. 2 is a schematic block diagram of the system of FIG. 1 illustrating an example of the processing of an input order to the system.

FIG. 2 illustrates the placing an order in the system of the present invention. This scenario depicts a situation where one client has requested to be informed on events related to a given security sometime before a second client places an order for that security.

An overview of the steps is as follows:
1. Monitor Security
2. Return Latest Data
3. Input Order
4. Distribute Order
5. Distribute Ticker Data Monitor Security The CORE client program T1 formats and transmits a message for the system to handle, requesting to be kept informed on changes concerning a certain security. The client expects whatever response is appropriate to be directed only to the initiating program. The message is transmitted via the Internet or some virtual network 14 trough a messaging server 12. The message is delivered to the system through a server topic, guaranteeing that it will be processed exactly once. A server-side component charged with tracking the expressed interests of client applications SM2 received the message and makes the proper changes to its subscription lists.

Place an Order

At some later time, a CORE client program T2 formats and transmits a message for the system to place a new order for the security in question. The client expects a positive response to be directed to all interested parties interacting with the system. The message is transmitted via the Internet or some virtual network 14 through a messaging server 12. The message is delivered to the system through a server topic, guaranteeing that is will be processed exactly once. A server-side component charged with routing and matching orders TE receives the message and makes the proper changes to its active orders lists. Details of the new order are then transmitted to any registered interested party TI and T2 via the appropriate distributed topic. Order details relevant to the ticker (which is potentially run on every client) is transmitted through a special distribution topic, the ticker topic, which is configured to be read once by every client that has registered as a party interested in this information.

Figure 3:
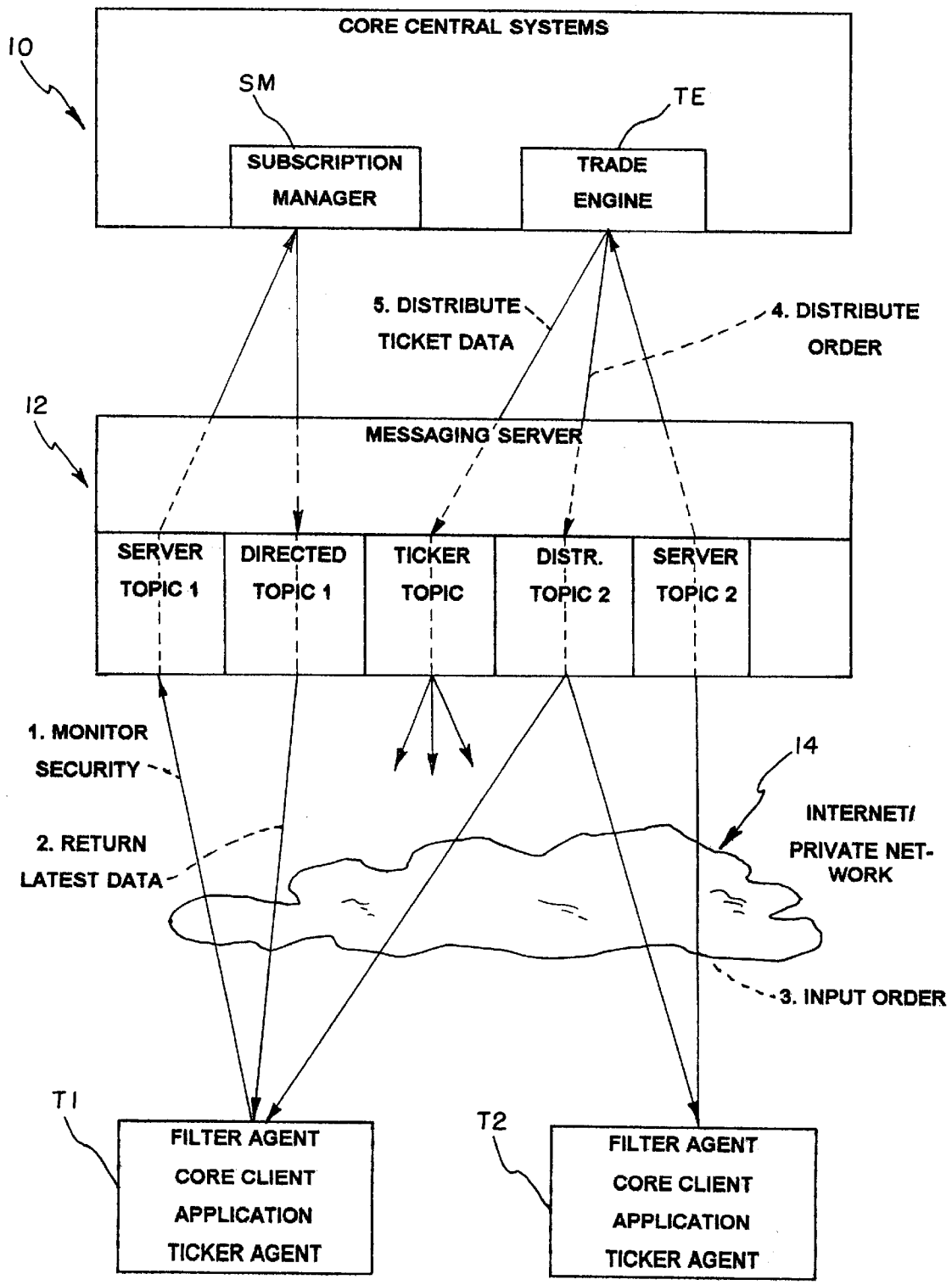
FIG. 3 is a schematic illustration of the operation of the system in connection with a match order.

FIG. 3 illustrates the processing of a match order using the system of FIG. 1. This scenario depicts a situation where one client has requested to be informed on events related to a given security sometime, then a second client places a bid for that security, then a third client places an ask for that same security.

An overview of the processing step are numbered in FIG. 2 as follows:
1. Monitor Security
2. Return Latest Data
3. Input Bid Order
4. Distribute Bid Order
5. Distribute Ticker Data
6. Input Ask Order
7. Distribute Ask Order (also Distribute Ticker Data
8. External prices converge making orders cross
9. Crossed orders are matched
10. Distribute Trade Detail Monitor Security The CORE client program T1 formats and transmits a message for the system to handle, requesting to be kept informed on changes concerning a certain security. The client expects whatever response is appropriate to be directed only to the initiating program. The message is transmitted via the Internet or some virtual network 14 through a messaging server 12. The message is delivered to the system through a server topic ST1, guaranteeing that it will be processed exactly once. A server-side component charged with tracking the expressed interests of client applications SM2 receives the message and makes the proper changes to its subscription lists. The subscription manager also ensures that any current information on the interesting security is formatted and transmitted directly to the initiating program via a directed topic DT1.

Place a Bid Order

At some later time, a CORE client program T2 formats and transmits a message for the system to place a new bid order for the security in question. The client expects a positive response to be directed to all interested parties interaction with the system. The message is transmitted via the Internet or some virtual network 14 through a messaging server 12. The message is delivered to the system through a server topic ST2, guaranteeing that it will be processed exactly once. A server-side component charged with routing and matching orders TE receives the message and makes the proper changes to its active orders lists. Details of the new order are then transmitted to any registered interested party T1,T2 via the appropriate distributed topic.

Order details relevant to the ticker (which is potentially run on every client) is transmitted through a special distribution topic, the ticker topic, which is configured to be read once by the ticker agent TA of ever client that has registered as a party interested in this information.

Place an Ask Order

At some later time, a CORE client program T3 formats and transmits a message for the system to place a new ask order for the security in question. The client expects a positive response to be directed to all interested parties interacting with the system. The message is transmitted via the Internet or some virtual network 14 through a messaging server 12. The message is delivered to the system through a server topic ST2, guaranteeing that it will be processed exactly once. A server-side component charged with routing and matching orders TE receives the message and makes the proper changes to its active orders lists. Details of the new order are then transmitted to any registered interested party T1, T2, and T3 via the appropriate distributed topic.

Distribution of Algorithmic Orders, or Attributes of Algorithms as Orders, Instead of Distribution of Prices Generated from Algorithms Some of the major benefits of present invention's trading system are derived from its unique algorithmic order distribution methodology (the distribution of the orders in algorithmic form).

The general form of the algorithm with respect to any order can be sent with the order or reside in a library on the trader terminal. Fields within the order define the attributes of the general form algorithm and those attributes define a specific algorithm of the general form or "algorithmic order". The present inventions' algorithmic order is a straight line with constraints thereon in the general form $y=mx+b$. We refer to the orders as either algorithmic or conditional orders because the fields of an order define specific arithmetic algorithms of one or more general forms and the order to purchase or sell an item can be subject to, among other conditions, the condition that another item is purchased or sold contemporaneously.

Examples of benefits created by the distribution of algorithmic orders or attributes thereof are:

1) it creates the ability for each client user interface to view the orderbook, orders, or historical orders in formats independent of one another,
2) it provides enough information so that each client can operate on or change the assumptions implied in the view of orders, including changing the view of orders or orderbooks, "as if" the price of underlying item(s) has changed thus allowing the user to place the derived prices of orders into his own mental frame of reference,
3) it reduces bandwidth demands when there are multiple orders or orderbooks which derive their value, in part, from the same underlying security, and
4) it allows the user to input an exact opposite order (in algorithmic form) which will be used to hit, take or negotiate with another order.

This list is meant to provide the reader with several examples and is not meant to be inclusive of all of the benefits that can be derived from the use of this methodology in a transaction hub. The methodology gives information to the user interface that it can use to make independent analysis create counter analytic orders, and use in the display of historic relationships. The methodology also allows for the separation of the functions on the user interface from the logic inside of the trade engine and does not require that the user interface be a "view into the trade engine's Order Book", but that the trade engine can be viewed and operate independent of the way the user interfaces can view and operate on the same orders.

Example 1

One user can view a risk arbitrage Order Book in several formats, first an acquiree security price vs. acquiror security price, second, an "arbitrage discount" price of the acquiree vs. the acquiror security price, and third, a "return on investment" vs. the acquiror security price. In the first instance, the user is viewing security prices and there are no analytic assumptions involved, but he can change the underlying price and view the set of orders properly sorted and displayed as if the price of the underlying security had changed. This would not have an impact on the way other users viewed the information, nor would it have any impact upon the way the trade engine viewed manages the orders.

Example 2

In the above example (third view: "return on investment" vs. the acquiror security price) assumptions as to time remaining until the close of the deal, cost of carry, short rebates, expected dividend dates, volatility to name a few can be input by each user and the interface can display the orders with that user's assumptions implicit in the "return on investment" view of the Order Book. Because each user's Order Book shows different numbers, one user can enter an order on an 18% IRR while another can enter an order on a 12% IRR and they may be exactly the same (each represented as 12% on one user's screen and 18% on another's , and different other terminals).

Example 3

Currently the bandwidth requirements of the options markets are enormous and growing daily. This is because there are multiple contracts (puts and calls) on each underlying security. When the underlying stock price of a security like IBM changes, the floor traders raise or lower the bid and offer prices on the options. Since a ½-point change in IBM can have an impact on the prices of 100–200 contracts, the bandwidth usage for the distribution of the new quotes can be very large. Our distribution of algorithmic orders, as a methodology, has the effect of reducing the bandwidth because we need only send the changes in the underlying security price to the user interface. The user interface will take the changes in the underlying security price and represent the orders in the 100–200 contracts without the need for a "redistribution" of quotes.

Example 4

If it were not for the fact that the algorithmic orders were sent to the user interface in their full form, the user would not be able to enter an order that exactly matched the order with which he wanted to trade regardless of changes to the underlying security price. Order generation and delivery in this manner also allows the trade engine to be flexible in its choice of underlying prices for use in its trading logic. Consider what happens when a trader attempts to hit a quoted bid for a single stock call option on an options exchange while the common stock underlying the option is dropping in price on an exchange. Typically, the investor would not be able to sell at the quoted price because the quotes are not real bids and the sensitivity of the quotes are not disclosed to the trader. The same quoted bid (sensitive to underlying stock) within the present invention's system is executable in part because the entry of an algorithmic opposite-side order is possible. If the same trader wanted to "hit" the bid, he would create an algorithmic opposite-side order and send that order. Because the sell price is equal to the buy price at any underlying security price, the trade can be executed even in markets when the underlying security is extremely volatile.

Orders

Each order received or sent by a trader workstation contains enough information to define a line in two-dimensional space, the algorithm of the line taking its general form either from a library residing on the trader terminal or from a field within the order. Information that is submitted to the trader terminal, either through user input or from the messaging server, can be used as an independent variable by the algorithm on a trader terminal to determine a unique dependent variable which can be represented as a point on the aforementioned line, or a price at which a trader is willing to trade subject to other constraints contained within the order. In the present invention's convertible system, the default algorithm can be represented by the formula $y=mx+b$, where y, the dependent variable, is the price of the derivative, m is the ratio of the quantity of the derivative to be traded divided by the quantity of the underlying security multiplied by a constant, x, an independent variable, is the price of the underlying security, and b is a constant derived from fields within the order. Multiple orders, each represented by a price, subject to constraints, can be sorted and displayed on a trader terminal in relationship to a unique independent variable.

An example of two orders, their graphical representation, and the algorithm used to determine prices and their relative favorability will follow.

Figure 17:
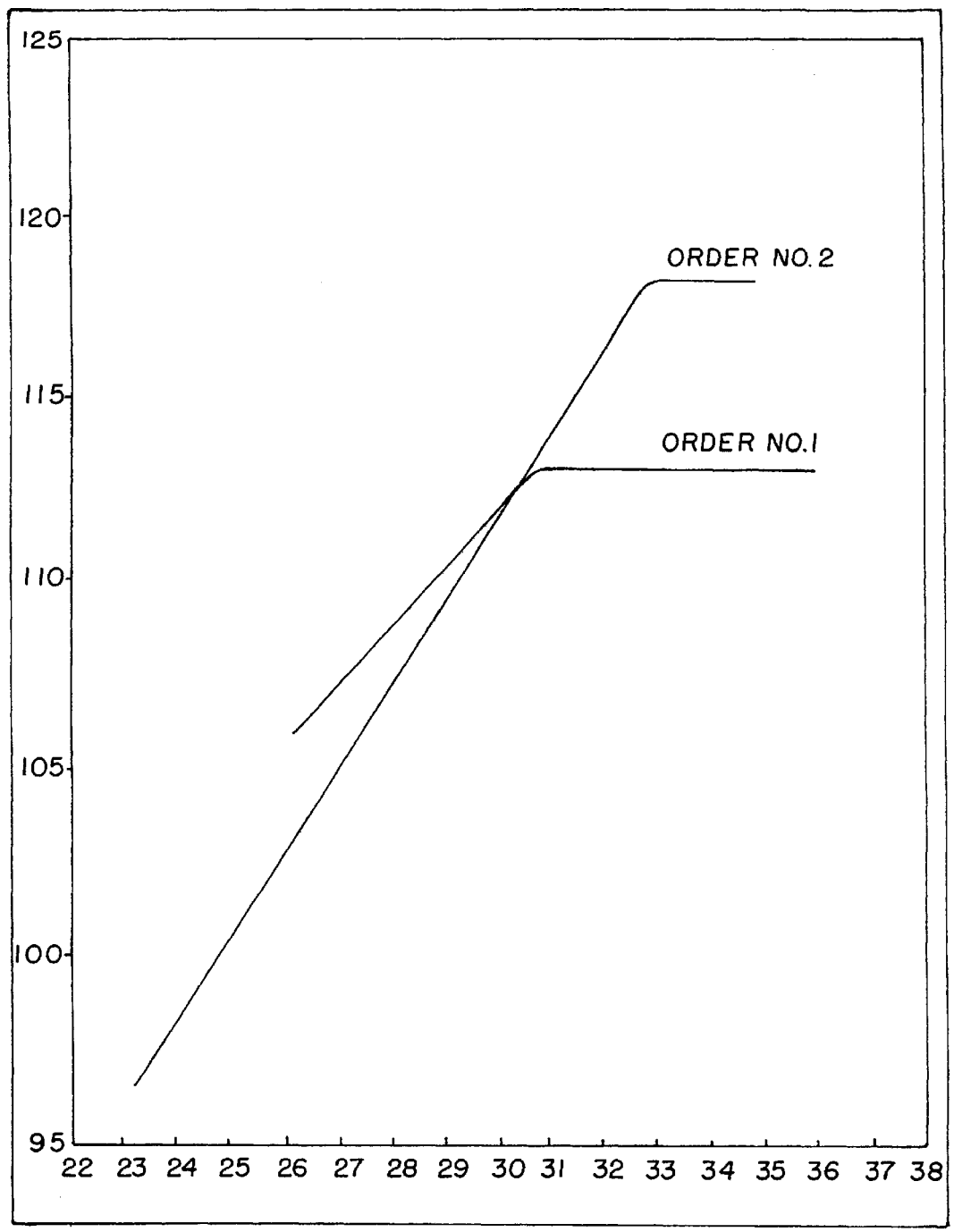
FIG. 17 is a graphical representation of the algorithms for two exemplary orders to be processed by the system of the present invention.

FIG. 17 of the drawings depicts a graphical representation of the two orders described hereinafter in Tables I and II.

TABLE 1

ORDER HEADER

| NAME | ORDER #1 | ORDER #2 | DESCRIPTION | | |
|---|---|---|---|---|---|
| Cancel Reason | 0 | 0 | CODE | DESCRIPTION | |
| | | | 0 | Undefined | |
| | | | 1 | User Cancelled Order | |
| | | | 2 | Order Exceeded Collar | |
| | | | 3 | Order Expired | |
| | | | 4 | Negotiation Denied | |
| Cancellation Time | N/A | N/A | | | |
| Expiration Time | Jul. 13, 2000 00:00 | Jul. 13, 2000 00:00 | The date and time (Eastern Time Zone) when the order should expire if the expiration type is "Good Until Specific Time." If the expiration type is "Good Until Day End" the time is, by convention, set to 23:59:59 that day. | | |

TABLE 1-continued

ORDER HEADER

| NAME | ORDER #1 | ORDER #2 | DESCRIPTION | |
|---|---|---|---|---|
| Expiration Type | 3 | 3 | CODE | DESCRIPTION |
| | | | 0 | Good Until Cancelled |
| | | | 1 | Good Until User Logs Out |
| | | | 2 | Good Until Specific Time |
| | | | 3 | Good Until Day End |
| Line Size | 2 | 2 | Number of lines belonging to the order. For outright orders, this is currently one. For pegged the second line consists of the pegged information; For swaps the second line consists of the underlying component. | |
| Negotiate Order ID | N/A | N/A | In a private negotiation, the ID number of the order the user would like to counter. | |
| Order ID | 1456 | 1459 | Unique order identifier. Ignored when placing an order. | |
| Order Status | 1 | 1 | CODE | DESCRIPTION |
| | | | 0 | Initial |
| | | | 1 | Open |
| | | | 2 | Traded |
| | | | 3 | Cancelled |
| Order Type | 1 | 1 | CODE | DESCRIPTION |
| | | | 1 | Swap |
| | | | 2 | Pegged |
| | | | 3 | Outright |
| Primary Exchange | 0 | 0 | The internal ID designating where the order should be placed. Examples of these include the following: | |
| | | | CODE | DESCRIPTION |
| | | | 0 | Fifth Market |
| | | | 1 | NYSE |
| | | | 2 | NASDAQ |
| Replace Order ID | N/A | N/A | In a private negotiation, the ID number of the user's order that should be cancelled and replaced. | |
| System Creation Time | Jul. 12, 2000 10:02:35 | Jul. 12, 2000 10:12:42 | When the order was received by the servers. | |
| User Creation Time | Jul. 12, 2000 10:02:33 | Jul. 12, 2000 10:12:41 | When the order was created according to the trading system's clock maintained on the user's computer. | |
| User ID | 14526 | 13872 | The user's ID number. | |
| Visibility Code | 0 | 0 | CODE | DESCRIPTION |
| | | | 0 | Visible to all users |
| | | | 1 | Part of a private negotiation. Visible only to the two negotiating parties. |
| | | | 2 | Not visible to anyone |

TABLE 2

Order Line Information

| NAME | ORDER #1D | ORDER #1U | ORDER #2D | ORDER #2U | DESCRIPTION |
|---|---|---|---|---|---|
| Cancelled Quantity | 0 | 0 | 0 | 0 | Amount on this order line that has been cancelled. |

TABLE 2-continued

Order Line Information

| NAME | ORDER #1D | ORDER #1U | ORDER #2D | ORDER #2U | DESCRIPTION |
|---|---|---|---|---|---|
| Exchange ID | 0 | 0 | 0 | 0 | The internal ID designating where the order should be placed. Examples of these include the following: |
| | | | | | CODE / DESCRIPTION: 0 Fifth Market; 1 NYSE; 2 NASDAQ |
| Group factor | 1 | 24.5 | 1 | 24.5 | Numerical relationship of this security to the convertible, for underlying stock it is the bond's conversion ratio. |
| Security ID | 435 | 123 | 435 | 123 | Uniquely identifies a security |
| Split Factor | 1 | 1 | 1 | 1 | Factor used to normalize security information across stock splits. |
| Last Trade Price | 0 | 0 | 0 | 0 | The price at which any portion of this line last traded. |
| Line Number | 1 | 2 | 1 | 2 | By convention, the derivative is in line one and any underlying stock information is found beginning at line 2. |
| Maximum Price | 113 | 36 | 118 | 35 | Upper collar value. If the security trades above this price, the order is killed (line 2). CAP. maximum price effect a trade (line 1) |
| Minimum Price | N/A | 26 | N/A | 23 | Lower collar value. If the security trades below this price, the order is killed (line 2). Floor. minimum price to effect a trade (line 1). |
| Minimum quantity | 40 | Null | 50 | Null | Minimum quantity acceptable on the first partial trade executing this order |
| Order ID | 1456 | 1456 | 1459 | 1459 | Identifies order line's corresponding order |
| Original Quantity | 300 | 4500 | 275 | 6000 | Quantity originally bid or asked. The remaining amount can be calculated by subtracting Cancelled Quantity and Traded Quantity from this amount. |
| Pegged Indicator | False | False | False | False | Indicates the Order Line contains underlying information for a Pegged Order |
| Price | 112 | 30 | 113 | 30.5 | Price for bid or ask |
| Short Sell Indicator | N/A | True | N/A | True | Indicates a short sell |
| Side | B | S | B | S | CODE / DESCRIPTION: B Buy; S Sell |
| Status | 0 | 0 | 0 | 0 | CODE / DESCRIPTION: 0 Initial; 1 Open; 2 Rejected; 3 Pending Execution; 4 Pending Cancellation; 5 Traded; 6 Cancelled; 7 Expired |
| Traded Quantity | 0 | 0 | 0 | 0 | Amount on this order line that has been traded. |

FIG. 17 was derived from the order information above and represents the prices that would be paid by each trader in the two orders for an underlying stock price. The starting and ending points of the line are minimum and maximum prices of the underlying portion of each other (Collar), the flat parts of the line are the maximum prices of the derivative (Cap), while the sloping portion is a representation of the region where the price is sensitive to underlying price movements.

The general price algorithm for the two orders in Tables 1 and 2 are:
Derivative Price=For r<X<s, Min [(X−a)(b)/c/d+e, f], or
Derivative Price=For r<x<s, Min [m*X+b, f], where m=q/c/d, and b=−a*q/c/d+e Table 3 shows the relevant fields of the two orders in Tables 1 and 2 which are used in the determination of the specific algorithm related to each order.

TABLE 3

| | Attribute value | Order #1 | Order #2 |
|---|---|---|---|
| Minimum Price (U) | r | 26 | 23 |
| Maximum Price (U) | s | 36 | 35 |
| Price (U) | a | 30 | 30.5 |
| Original Quantity (U) | q | 4500 | 6000 |
| Original Quantity (D) | c | 300 | 275 |
| Pricing convention (constant) | d | 10 | 10 |
| Price (D) | e | 112 | 113 |
| Maximum Price (D) | f | 113 | 118 |

(D) An item that derives its value, in part, from another item.
(U) The underlying item from which prices are derived.

Price Algorithms for the two orders referred to in Tables 1–3 follow:
Order #1: Derivative Price=26<X<36, Min (1.5X+67, 113)
Order #2: Derivative Price=23<X<35, Min (2.1818X+46.4545,118)

Trade Execution and the Tapping of External Liquidity Pools

Table 4 displays the matrix logic for seven separate and distinct orders for the same security. The crossing points represent prices at which a trade is possible between two different orders. A buyer willing to pay 102 with no other contingencies could trade with a seller willing to sell at 103 contingent upon buying stock at 32 if the price of the stock drops as in B1 and S2. The underlying price at which these two orders could trade is when stock could be purchased at 31.5, the bond would trade at 102. If 5000 shares could be purchased at 31.5, 250 bonds would trade. Only the closest underlying crossing points are maintained (buy at 31.5 and sell at 32.6) since there must be a trade at these prices before there can be a bid above our sell order or an offer below our buy order.

clear to those skilled in the art that these crossing points can also be derived from orders involving non-linear relationships. The method of calculating the crossing points for their input into the matrix that was used in the example above was a simple algorithmic manipulation, while methods for cal-

TABLE 4

B1  Buy 500; Price = 102, no other contingencies
B2  Buy 250; Price = 102 versus selling 5000 underlying shares at 32
B3  Buy 100; Price = 102 pegged to the bid price of the underlying shares on an implied hedge of (1500) shares at 32¼
S1  Sell 500; Price 103¼, no other contingencies
S2  Sell 250; Price 103 versus buying 5000 underlying shares at 32
S3  Sell 100; Price 103 pegged to the ask price of the underlying shares on an implied hedge of 1500 shares at 32
S4  Sell 300; Price 103 versus buying 1000 underlying shares at 32

| | Prices of crossing points (underlying) | | | | Prices of crossing points (Derivative) | | |
|---|---|---|---|---|---|---|---|
| S4 | 29 | 32.6 | 33.1785 | S4 | 102 | 103.2 | 103.393 |
| S3 | 31.333 | 34 | | S3 | 102 | 106 | |
| S2 | 31.5 | | 29.25 | S2 | 102 | 0 | 97.5 |
| S1 | | 32.625 | 33.083 | S1 | 0 | 103.25 | 103.25 |
| | B1 | B2 | B3 | | B1 | B2 | B3 |

| | Quantities to be traded at crossing points (underlying) | | | | Quantities to be traded at crossing points (Derivative) | | |
|---|---|---|---|---|---|---|---|
| S4 | 1000 | 5000 | 333 | S4 | 300 | 250 | 100 |
| S3 | 0 | 2000 | | S3 | 100 | 100 | |
| S2 | 5000 | | 2000 | S2 | 250 | | 100 |
| S1 | | 5000 | 0 | S1 | | 250 | 100 |
| | B1 | B2 | B3 | | B1 | B2 | B3 |

| | (Overage)/Underage of underlying at crossing point | | | | Next most likely trading points | | |
|---|---|---|---|---|---|---|---|
| S4 | 1000 | −4000 | 333 | S4 | | (32.60) | * |
| S3 | 0 | −2000 | | S3 | ** | | |
| S2 | 5000 | | 2000 | S2 | 31.5 | | |
| S1 | | −5000 | | S1 | | | *** |
| | B1 | B2 | B3 | | B1 | B2 | B3 |

*This point, (333 shares to be purchased at 33.1785) is subject to an available bid for the underlying security at 33.1785 or higher on an external exchange. It is somewhat of an anomaly because the point at which the system would be required to submit a buy order is above the level at which the system would submit a sell order.
**This point requires that the asking price of the underlying security on an external exchange is below 31.333.
***This point requires that the bid price of the underlying security on an external exchange is above 33.083.
It is not possible for the bid price to be above 33 or the ask price to be below 31.33 since the system is willing to purchase 5000 shares of the underlying security at 31.5 or sell 4000 shares of the underlying security at 32.6. In a preferred embodiment, the points represented by asterisks are ignored until the price contingency has been satisfied, at which time the system is allowed to effect a transaction or generate an order to satisfy an overage or underage.

This method involves the comparison of each buy order against each sell order and compares the requirements for a trade with the requirements for each other trade to ascertain the events most likely to occur and thus the most likely trades to occur first. The matrix identifies the optimal buy/sell pair for potential events and calculates the price and quantities of securities for which an external liquidity source must be tapped and the prices of the underlying security which will trigger a trade. In this case, trade triggering events are 1) new orders entered into the system which would satisfy the requirements of an opposite-side order at the current underlying stock price, 2) a movement in the underlying common stock price, or 3) the execution or partial execution of an order which has been sent to an external exchange by the system in its attempt to help effect a trade (the sale of 4000 shares at 32.6 in the example).

While linear relationships between the derivative and the underlying are shown in the example above, it should be culating crossing points in complex non-linear relationships could be numerical optimization techniques.

As new orders are entered into each Order Book, the parameters of the new order are checked to ascertain tradable orders. Tradable orders, to the extent executable are executed and the residual amounts are re-entered into the matrix.

Orders can have caps (the price over which no purchase can be made), floors (the price under which no sale can be made), and collars set to kill or temporarily suspend an order if the price of another security is outside specified ranges.

Orders can have time in force characteristics like "day order," "good til cancelled," "Immediate or cancel," session, specific time period, etc.

It should be clear to those skilled in the art that the invention can be used for multiple items like securities, contracts for commodities, contracts for indexes, and other items including futures, options, or contracts on those items.

The trade engine is unique, useful and economically important in that it ascertains, in advance of possible movements in the independent variable, the key independent variable values that could trigger a transaction and prepares the system in advance for the delivery of orders to purchase or sell the overage or underage to external liquidity sources in an attempt to aide the execution of trades on the relevant Order Book.

It should be noted here that there is a conceptual difference between Order Books, those of the trade engine and those of the trader terminal, where the trader views orders in a format which uses the underlying price as its primary independent variable from which prices of orders are calculated, the trade engine views each order independently and looks for prices of the underlying security in which buy orders can be executed against sell orders with or without the aide of an outside liquidity source. Another major difference is that the Order Book of the client interface can integrate orders residing in external Order Books, like the New York Stock Exchange or other ATS's, into the client's view of a particular security and aide the client in his decision to purchase or sell securities within the internal trade engine or to route orders to other pools of liquidity while the trade engine directs orders to other exchanges and monitors the price levels of securities in those exchanges for key prices.

The ability for the Order Books on the trader terminals to integrate and display orders from multiple trade engines or exchanges is particularly useful when there are external liquidity sources for both the underlying security and the derivative security as in equity options, index options, risk arbitrage, options on futures, futures on commodities, etc.

Some embodiments of the invention may include implementations as a program or set of programs for one or more computing devices to execute the method or methods described herein. According to the computer system's implementation, sets of instructions for executing the method or methods may reside on one or more computing devices and may be stored on any of various storage devices including, but not limited to, electromechanical or electromagnetic devices for storing information in magnetic, chemical, physical or optical form such as devices commonly referred to as "hard disks", "floppy disks", "diskettes", "compact disks", "DVD" disks, or "RAM". Moreover, the computer program product can also be stored at another computing device or a remote storage device and, when needed, can be transmitted in a computer readable medium to the various participant's computer devices as a data signal in a carrier wave over electromagnetic wave media along a communication link such as a Mainframe Data Cache, a Local Area Network, a Virtual Private Network, an Extranet, the Internet and others.

Implementations of the program or set of programs can be architected to conform to one-tier, two-tier, three-tier, or N-tier design patterns as required by the computational operating environment of the participants. One-tier architectures are typically found on mainframe computers where participants each have access to the program or set of programs through terminals consisting of a simple video display device and a keyboard input device. Two-tier architectures, also known as client/server architectures, are generally found in Local Area Networks where participants typically have interdependent computing devices, such as Personal Computers or Personal Workstations (the clients), which have been configured to share a common resources on the network (the server), such as a shared instance of the computer systems implementation, an accessible set or sets of instructions for the program product for transmission to each participant's personal computing device, or a common repository for the persisted information required by the embodiment of this invention. Although the invention could be realized in a set of computer instructions conforming to one of the aforementioned architectures, these are generally reserved for situations where all the participants are members of a single institutional entity, corporation, or educational center.

Three-tier architectures are more commonly represented by programming products that are implemented over the World Wide Web ("The Web"). The Web is a hypertext information and communication system deployed over the Internet using various computer languages and protocols where, historically, each integral unit of information, known as a "web page", has consisted of information presented using the Hypertext Markup Language (HTML), a language capable of rendering text, graphics, images, sound, and video. Web pages are generally produced by a Web server (tier 1) using data stored in a central information repository (i.e. a database server, tier 2) and delivered to the participant where it is processed and statically displayed through the use of a "web browser", such as Netscape Navigators or Microsoft Internet Explorer™, found on the participant's computing device, e.g. computer, cellular telephone, personal digital assistant, etc. (the client, tier 3). Recent developments in computer science have brought about the advent of other languages, specifications, and protocols, such as, JScript, VBScript, ASP, JSP, ActiveX, Java Beans, Java Applets, and XML, which have enabled programmers to develop highly interactive program products targeted for deployment on The Web. Computer systems products developed within in this environment widely acceptable by network participants and have become the mainstay of the so-called e-commerce revolution, however, they suffer from being subject to the varied and sometimes contradictory exigencies of the more popular web browsers.

The present invention, as embodied in the data processing system herein described, conforms to the N-tier design pattern, and as such, has been developed as a highly interactive program comprising a computer application that executes on the participant's computing device (the client) and a variety of computer components running on a plurality of centralized computer systems (the N servers). The invention has been materialized as a set of computer instructions written in the Java™ programming language and may be executed on any computing device that is capable of instantiating a Java Virtual Machine hosting a compatible version of the Java Runtime Environment and also capable supporting a standard graphical video monitor, a standard computer keyboard, and a standard pointing device such as, but not limited to, a "mouse", a "track ball", or a "touch pad", and a standard TCP/IP connection to an Intranet, an Extranet or the Internet. Java™, is an object-oriented language, derivative of C++, that was developed specifically to facilitate the implementation of computer program products meant to execute unaltered on a variety of computing devices, such as computers, consumer electronic gadgets, home appliances, and computerized industrial machinery, linked to, and communicating with, one another via any existing communication link.

The computer systems product, as seen by the network participant, consists of a rectangular sections of the video display monitor, known as windows and panes, comprising standard graphical user interface components developed using the Java AWT™ and the Java Swing™ graphical libraries, such as "buttons", "text boxes", "labels", "lists", and "tables", with which said participant may manipulate the content and format of the information display or input information to be transmitted to the server tiers of the product.

When the network participant initially connects to user managing component of the computer system product, the most recent version of the set of instructions, in the form of Java™ byte-code, a cross-platform specification for computer instructions, is transmitted to the participant's computing device, assuring product version uniformity.

The request to connect to the computer product server components, and all subsequent participant requests, and all subsequent server-side initiated transmissions are delivered using a Java™ Message Service (JMS) compliant Message Oriented Middleware (MOM). The JMS specifications provide for reliable, flexible, configurable, asynchronous exchange of critical information between the client and the server-side components within distributed computing environment. A non-JMS compliant MOM or a proprietary messaging service could be substituted for the JMS MOM provided it supported the required functionality which includes, but is not limited to: guaranteed message delivery, persistent messaging, message broadcasts, point-to-point messages, and scalability.

Participant requests are intercepted by a User and Order Management Service implemented as a collection of Enterprise JavaBeans™ (EJB), running on an EJB-compliant application server, designed to manage all issues pertaining to information access, data persistence to a Relational Database Management System, and data transmission to and from various server components, and data transmission from the server components taken as a whole to client programs running on the participant's computing device, individually or taken together in unison. The EJB specifications provide for a server-side component architecture for distributed, transactional, persisted, secure applications. Other forms of highly available component managing application servers may be available or may be written for this purpose.

Pertinent order-related requests and messages are relayed from the Order Management System to the appropriate Trade Engine for processing. The Trade Engine is the server-side system component ultimately charged with verifying order information as valid and designating the order as open, matching open orders when circumstances, such as movement in the underlying securities market, as reported by the Price Feed Server, so dictate, and removing orders from consideration when circumstances, such as the aforementioned movement in the securities market or the passage of time past an expiration point, so dictate.

FIGS. 4 to 14 illustrate features of a client/subscriber/trader display screen using the system of FIG. 1. The network is designed to increase the price transparency of these types of transactions among the users of the system. To accomplish this, the system provides real-time market data and communication links between hedge funds, institutions, professional money managers, exchange specialists, Nasdaq market makers, and international banks and broker-dealers.

A variety of trading related functions is provided to trader/subscribers. These functions include: monitoring securities of various types, receiving market data, entering and executing orders on the proprietary Order Book, negotiating trades against other orders in the book, and routing orders to various exchanges such as the NYSE, Nasdaq, AMEX and the PSE through DOT, ITS or SelectNet. In addition. subscribers may automatically receive and monitor confirmations of trade executions, access static data from the system database and analyze securities or potential trades using that data and real-time prices.

Figure 4:
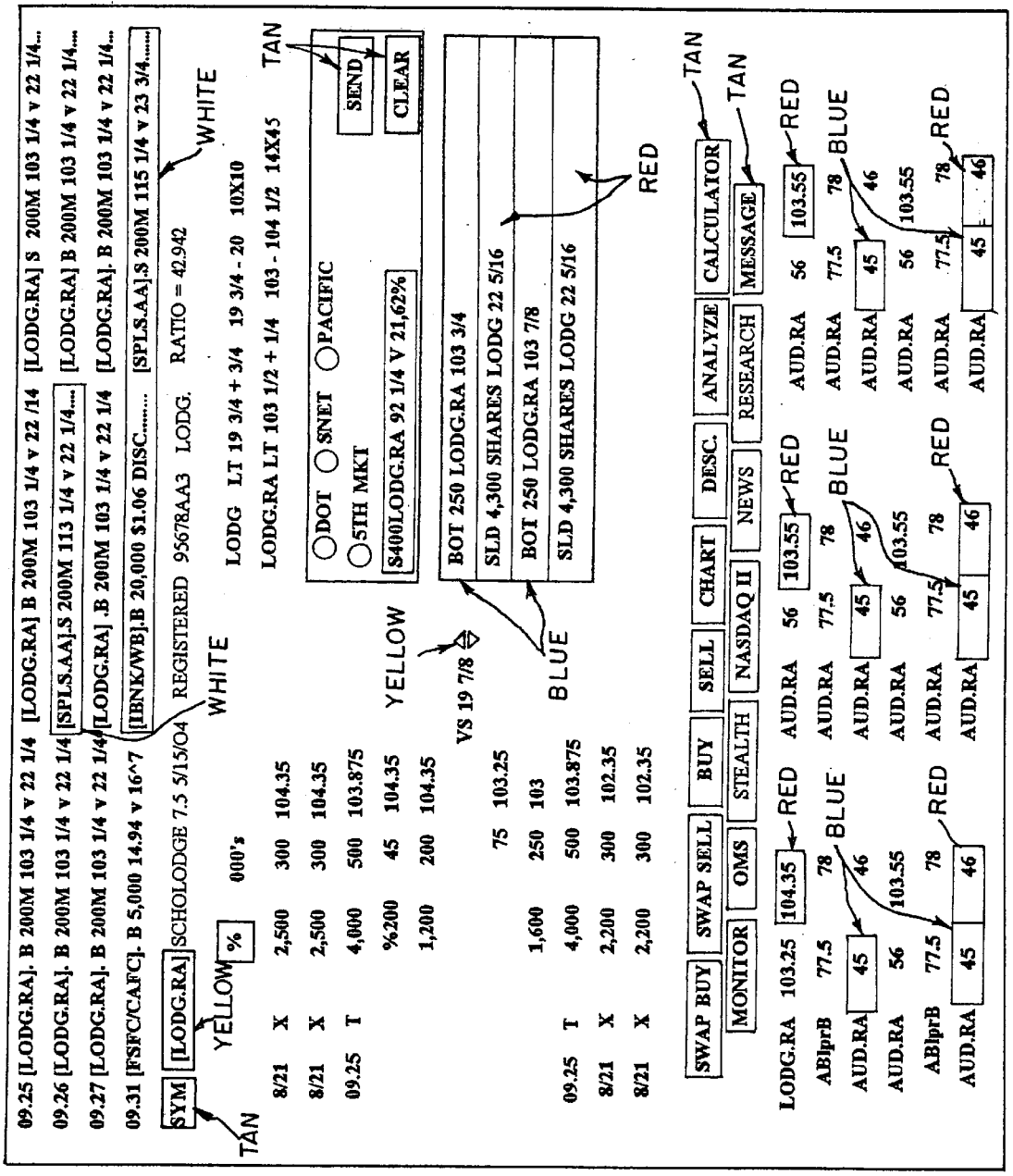
FIG. 4 is an illustration of a display screen at a trader/subscriber/user terminal for use in the system of the present invention depicting various display fields.

The functions available to the user include the following:
1) A ticker tape with unique features and form;
2) A specially designed Order Book including:
   a) Order routing into the book
   b) Order routing to NYSE/AMEX via DOT
   c) Order routing to Nasdaq via SelectNet
   d) ITS linked order routing through the PSE
   e) Trade Report Monitor
   f) Viewing the book sorted by prices
3) Wild Card Workspace including:
   a) Security Market Monitor
   b) Nasdaq Level II
   c) Basket Order Entry/Order Management
   d) Graphic representation of past orders or trades on the book
   e) Database, Research, and Analysis
   f) Administrative Messaging FIG. 4 depicts the display screen 100 of a subscriber/trader terminal.

FIGS. 5 to 14 depict the separate component sections of the display screen of FIG. 4.

FIG. 5—The Ticker Section

The ticker tape 102 allows users to view information within the system in a consistent and intuitive manner. Initially, the information displayed will include all bids and offers that are entered into the CORE system Order Book as well as all trades that occur on the system. These bids, offers, and trades will include the following data elements relative to each: Security identification symbol; whether the order is a bid, an offer, or a trade; quantity; and price versus its related security price. As an example, a customer entering an order to Buy 250M Staples 5% Mar. 1, 2005, 144a bonds at a price of 114 ¼ conditioned upon selling 2000 shares of Staples common stock short at 22 ½ would be displayed on the Ticker as ". . . [SPLS.AB].B 250M 114 ¼ 22 ½ . . . ". A sell order would be represented by the letter "S" after the symbol, and a trade would be represented by a "T". The relationship of the order to the user will invoke a color-coding scheme on the user's terminal. For example, if a user has an active order on the book in a security and someone puts either a competing or opposite order on the book, the new order will be displayed on the Ticker with a white background and either a blue or red foreground depending upon its direction (buy or sell). Other highlights like color, flash, and or special symbols will be used sparingly.

Symbols follow a couple of simple rules. Generally the common stock symbol used in its primary exchange is the first section before a dot (.), then either an R, A, S, E, or pr, pa, ps, pe. The "R" means the security has been registered, "A" means the security has a 144a status, "S" means regulation "S" status,"E" means eurobond, and pr means the security is a preferred stock. Generally, if a security derives its value from the price of the common stock in the symbol, the security symbol alone is used in the ticker, however, a more generalized symbol would be [APEprA/NB], or [LYX/LYO] where the first security is the security which derives its value in part from the value of the second security. This convention will be useful when the systems are developed for risk arbitrage, pairs, baskets, ADR's, or options.

The Ticker does not capture all of the information available. It displays only enough information for a user to screen for important bids, offers, and trades. A user can attain all available information behind the Ticker by selecting that symbol for the Order Book, or by clicking the ticker item which will have the same effect. If "[LODG.RA].B 200M 103^2 v 22a7" is used as an example, clicking on the "[LODG.RA]" will pull up the present invention's Convertible Order Book for [LODG.RA]; clicking on the ".B" will bring up both the Convertible Order Book for [LODG.RA] and a "Negotiation They Buy/We Sell Ticket" with the Symbol defaulted to [LODG.RA]; clicking on "200M" will bring up the Order Book, a "Negotiation They Buy/We Sell Ticket", and will place the Symbol and "200M" in the order form and lastly; clicking on 103^2 will bring up all of the above plus fill in the Buy Order Form with all of the information needed to execute the trade, defaulted to the buyers "buy parameters" and calculated on a dollar neutral basis to the current stock price. This may seem complex but intuitively, clicking on the symbol means you want to see that security, clicking on the .B or .S means you want to Buy or Sell, clicking on the volume means you want to buy or sell that volume, and clicking on the price means you want to buy or sell that volume at that price.

The following are examples of different types of Tickers and what they mean, they correspond to examples of orders displayed in the Order Book:

FIG. 6—Security Description Line

The system provides users with one line 104 of static descriptive information about the security that is being monitored on the Trade Book. This data includes: security symbol, name of issuer, coupon information, maturity information, registration type (registered, 144a, regulation S, etc.), cusip or other security identifier, symbol of the underlying security, and conversion ratio. This information is displayed to insure that the user is monitoring or trading the correct security.

| Description | Function |
| --- | --- |
| ① Softkey for symbol entry | pulls down options: Input; Directory; Symbol Description |
| ② System Symbol of the security currently being monitored on the Order Book | main identifier for system |
| ③ Name of Issuer | from static database |
| ④ Coupon/Dividend of Security | from static database |
| ⑤ Maturity Date of Security if applicable | from static database |
| ⑥ Registered/144a/Reg S/Euro trache of Security | from static database |
| ⑦ Cusip or other identifier | from static database |
| ⑧ Symbol of Related (underlying) security | from static database |
| ⑨ Conversion Ratio of security | from static database (daily update/check) |

| # | Ticker | Description |
| --- | --- | --- |
| 1 | [LODG.RA].B 100M 102^7 | Sholodge; Registered; 7½% May 15, 2003; Buyer; $100,000 face amount; Price = 102⅞; not conditional upon the price of any other security. |
| 2 | [LODG.RA].S 100M 103^7 v 22^2 | Sholodge; Registered; 7½% May 15, 2003; Seller; $100,000 face amount; Price = 103⅞; Sale conditioned upon purchasing the common stock of Sholodge at 22¼. |
| 3 | [LODG.RA].B 100M 102 p 21^4 | Sholodge; Registered; 7½% May 15, 2003; Buyer; $100,000 face amount; Price = 102; Purchase conditioned upon the bid in the primary market being 21½ (read: pegged to the bid) no stock will trade concurrently with the execution of this buy order. |
| 4 | [LODG.RA].T 95M 103.27 v 23^1 | Sholodge; Registered; 7½% May 15, 2003; Trade; $95,000 face amount; Price = 103.27XX; Traded simultaneously with the common stock of Sholodge at 23^1. |
| 5 |  | This is the general format for a ticker item, white on black, followed by several dots . . . , not bold. |
| 6 | [JBNK/WB].B 20,000 $1.06 disc. . . . | This format is one that occurs when the current user has an active order in [JBNK/WB] and a buy order is placed on the book. (blue on white) |
| 7 | [SPLS.AA].S 200M 115¼ v 23¾ . . . | This format is one that occurs when the current user has an active order in [SPLS.AA] and a sell order is placed on the book. (red on white) |
| 8 | [RXT.SA].S 500M 113 v 21^2 | Renal Treatment Seller of 500,000 face of the Reg. S bond at 113 versus buying stock at 21¼ |
| 9 | [AAPL].B 3000 22^2 | Apple Computer common stock buyer. |
| 10 | [LYX/LYO].S 5000 34^1 v 22^2 | Seller of LYX versus buying LYO (generalized form) |
| 11 | [JBNK/WB].B 5000 1.06d | Risk arb. discount nomenclature. Client transforms generalized form into discount nomenclature before displaying. |
| 12 | [JBNK/WB].S 4500 .95d☎ | Same as above, but the offer was made over the phone and is now subject. |
| 13 | [FSFC/CAFC].S 5000 14^2 v 15a1 | Risk arb. usual format. |
| 14 | Flashing Ticker Items | When an offering is made at/or lower than the last trade, it should blink 5 times, and when a bid is made at or higher than the last trade, it should blink 5 times. |

FIG. 7—Active Market Data

Users are provided with external pricing of securities that are being quoted on the Order Book. The following pricing information is provided on both the security presently on the Order Book and its underlying security.

Description

① Last Trade of Security on its primary exchange (NYSE, AMEX, Nasdaq) and difference from previous days close.

② Current Bid and Offer of the security on its primary exchange

③ Size of the bid and offer of the security on its primary market

④ The number of Subscribers currently monitoring that particular security

⑤ The last trade of the related security on its primary exchange and its difference from the previous days close ⑥ The current bid and offer of the related security on its primary exchange ⑦ The size of the bid and offer of the related security on its primary exchange sized to convention

FIG. 8—Order Book

The Order Book allows users to present bids or offers to, negotiate with, or trade with other users of the system. Users may access the Order Book through various means including: clicking on a particular order displayed on the Ticker Tape, entering a symbol in the Order Book symbol space, or clicking on a symbol being displayed in the market monitor section. Once a user is viewing the Order Book, the user may enter an order, negotiate with an existing order on the book, trade against an order on the book, or execute any of the soft key functions.

| ❶ | ❷ | ❸ | M❹ | USD❺ | |
|---|---|---|---|---|---|
| 21-Aug | X | 0.66 | 300 | 104.35 | |
| 9:25 | T | 0.68 | 500 | 103.875 | sell side of the book ❾ |
| | P | 0.65 | 45 | 104 | |
| | | 0.64 | 200 | 103.45 | |
| | | % ❻ | vs | ❼ | |
| | | | 75 | 103.25 | |
| | | 0.64 | 250 | 103 | |
| 9:25 | T | 0.68 | 500 | 102.875 | buy side of the book ❽ |
| 21-Aug | X | 0.66 | 300 | 102.56 | |

❶ Time or Date the order expired or was traded

❷ Key for various pieces of information  
X → Expired; T → Traded;  
A → Accumulated;  
p → Percent only (no stock);  
+ → Current user's order.  
N-non negotiable.

❸ Hedge Ratio or Shares see #6

❹ Principal amount of bonds (000's)

❺ Price

| | | |
|---|---|---|
| ❻ Percent Softkey/Shares | | Pushing % will change the character from a hedge percentage to a specific # of shares. |
| ❼ Price of underlying security on which the view of the orders is based. Defaults to an up-tick | | Pushing the up button will move the price up by 16ths until the current offer price is reached, pushing the down button will move the price down until the bid is reached. Any price can be input into the field. |

Figures 9, 10, 11:
FIG. 9 is a quick-order entry field of the display screen of FIG. 4, which depicts quick-order entries and various trade reports.
FIG. 10 is the soft-key, wild card display area of the display screen of FIG. 4.
FIG. 11 is the market monitor display field of the display screen of FIG. 4.

FIG. 9—Quick Order Entry/Trade Reports

The quick order entry workspace 108 allows users to enter orders directly into the Order Book or route orders to an exchange such as NYSE, AMEX or PSE through DOT and ITS or Nasdaq through SelectNet or an ECN.

The quick report display allows users to receive reports on all orders executed. Receipt of information other than via the quick report display will be handled by pop-up messaging and the Order Management System (OMS.)

FIG. 10—Soft Keys For Wild Card Area Display

The Soft Keys 110 located on the workspace 108 allow the user to access various pages, forms, and displays which are then displayed in the Wild Card Workspace. These function keys include:

| | | |
|---|---|---|
| Swap Buy | Conditional buy ticket for entering an order into the System book. | Pulls up form 1(a), inserts the security displayed on the Order Book. |
| Swap Sell | Conditional sell ticket for entering an order into the System book. | Pulls up form 1(b), inserts the security displayed on the Order Book. |
| Buy | Buy ticket for entering an outright order into the System book. | Pulls up form 1(c), inserts the security displayed on the Order Book |
| Sell | Sell ticket for entering an outright order into the System book. | Pulls up form 1(d), inserts the security displayed on the Order Book |
| Chart | Chart of bids, offers, and trades which have occurred in the System over a specified period. | Pulls up a display of the chart of the item displayed on the Order Book defaulted to 30 days. |
| Desc. | Gives users descriptive data on approximately 1000 securities. | Pulls up a display of a description of the security displayed on the Order Book. |
| Analyze | Allows users to analyze various security types based upon items available in the current database and current prices. | Pulls up an interactive form defaulted to the security displayed on the Order Book. The form different for different types of securities (Cvt Bonds, Cvt. Pref., Percs, Decs, Prides, Risk Arb., ADR's, etc.) |
| Calculator | Generally a "dollar neutral" calculator in the beginning. | Input price and hedge, output new price. |
| Monitor | Allows users to monitor the "top of the book" on approximately 36 securities. | Activates the Market Monitor section of the workspace. This is the default for the Wild Card Space. |

-continued

| | | |
|---|---|---|
| OMS | Allows users to enter batch orders, review trade reports, view un-executed and expired orders, adjust prices or quantities and reenter, and cancel orders. | Pulls up a list of orders (input by the user) with the stats. (active, expired, remaining, executed . . .) by time. There should be room for a dozen, and there will be some interaction between the OMS and the view of the Book. (e.g. Clicking on an order will pull that security into the book. |
| Stealth | Allows users to monitor various markets for price discrepancies. (not developed yet) Can also be used for internal order management. | Pulls up an indication input form. |
| NASDAQ | Allows users to view Nasdaq Level II information on any security. | Pulls up a display of Nasdaq Level II on the security displayed on the Order Book, or if not a Nasdaq security, then it would pull up a display of the underlying security. |
| Message | Allows users to send and receive messages from system operators. May eventually provide e-mail service and information delivery services. | Pop-ups for responses; form or input like e-mail. |

Other Softkeys are available on the outskirts of the Workspace. They may include buttons for specific securities, switches for different types of Order Books (pairs, risk arbitrage, ADR's, or convertible securities), or keys for user default settings, maintenance and communications.

FIG. 11—Wild Card Workspace

The Market Monitor Screen 112 is the default screen in the Wild Card section of the workspace. The Wild Card section is the area to which all forms default when they are pulled from the soft keys in the Order Book section of the workspace. The Market Monitor Screen 112 is the default or background over which Wild Cards (forms, pop-ups, reports, etc.) make their presence when activated.

The Market Monitor Screen 112 is meant to avail the user of timely and pertinent trading information on several securities in an intuitive manner. This is accomplished by integrating real-time market pricing and a color-coding schema which alerts the user of potential risk and opportunities. It is meant to be viewed in conjunction with the Ticker Tape.

In the above Market Monitor Screen 112, there are three fields of information. The first field is input by the user, and linked to a symbol, probably the same symbol, to the database and pricing mechanism. The second field is the bid side of the market and the third field is the offer side of the market on the security.

White-on-blue fields indicate that the user has the best active bid, and white-on-red fields indicate the user has the best active offer on the book. Blanks indicate no active order on that side of the market. And white-on-black items indicate someone other than that user has the best bid or offer on the book (the best offer and the best bid together are referred to as "the top of the book").

Prices may look different on the Market Monitor, if the user chooses that option, than they do on the Order Book, because the monitor is designed to show either the "top of the book" or the "spread" market. A "spread" market, in this context, means the "top of the book" adjusted for the spread between the bid and ask on the underlying security. For example, a market on the Order Book showing "102–102 ½ versus 23 ¼" (top of the book) may appear as 101.84–102 ½ (spread), this difference is because the 102–102 ½ market is a market conditioned on a single stock price while the bid side of the "spread" market is conditioned on the bid for the stock, and the offer side of the "spread" market is conditioned on the offer for the stock. The Market Monitor is designed to display the market both ways. A simple example, depicted in FIGS. 12 to 14, should explain how the various sections of the display screen Workspace interact.

The chart in FIG. 15 represents orders put into the system, whether outright or on-swap (conditional orders are sometimes referred to as "on-swap"), and how the price would look had the user executed against that order using the current hedge. The red dots are sell orders, the blue dots are buy orders, and the yellow are trades. This is proprietary data and can be accessed by all users of the system. The chart is sized to cover only the Wild Card Area of the workspace.

Each datapoint is derived from an original order, for example [LODG.RA].S 250M 109v 42ˆ on Feb. 22, 1997, might be represented on the graph as a point at 98.538 on Feb. 22, 1997 because the stock price when the graph was calculated was 38 ½ and the user defaulted the hedge ratio to 65% (conversion ratio is 42.92).

datapoint≡Bondprice+[(stockpx1−stockpx2)·hedge.ratio·conv.ratio]÷10 datapo int≡106+[(38 ½−42 ¼)·.65·42.92]÷10≡98.538

In the preferred embodiment of the present invention, the system sorts and displays the orders on a continuous basis, i.e., when a new order is entered, it is sorted by the client in the order of "best" price given; an underlying security price input, then, as the underlying security price input changes, (this is at least one, and the independent variable in our order's algorithm) the prices of each order (dependent variable) are recalculated and re-sorted.

In other words, when there are two buy orders entered, one which may look like:

Buy 500 IBM 7 ½% Jan. 1, 2001 at 92, and a second which looks like:

Buy 500 IBM 7 ½% 1/1/1 at 91 ¾ versus selling 10,000 shares of common stock at $35.00

They would be sorted:

| Sort 1 | | |
|---|---|---|
|  |  | 35 |
|  | 500 | 92 |
| 10,000 | 500 | 91¾ |

As the common goes up to $37, the view would change to:

| Sort 2 | | |
|---|---|---|
|  |  | 37 |
| 10,000 | 500 | 95¾ |
|  | 500 | 92 |

The following examples of orders could be processable by the system and method of the present invention with modification by those skilled in the art.

Example 1—Corporate Bonds

A corporate bond trader wishes to advertise that he would like to purchase 500M Citicorp 5% Jan. 1, 2001 bonds at a spread to the two-year-treasury of +65 basis points and simultaneously sell 500M of the two-year-treasury; he would like the order to expire in ½ hour; the minimum acceptable amount he is willing to transact is 100M; he is willing to allow the system to interact with other exchanges in its attempt to "fill" the order.

Example 11—Options

An option trader wishes to enter an order to purchase 10 march X calls on Microsoft at a volatility of 34% and coincidentally sell Y common shares of Microsoft at the price from which the volatility was calculated; where X can be any contract between 100 and 135 and Y is the corresponding "delta" arising from a calculation for that contract and the risk free interest rate defaulted to 6% multiplied by the number of contracts multiplied by a factor of 100 (one contract represents 100 shares); he is willing to execute any combination of contracts fitting this description but is only willing to purchase 10 total; he wants the offer to expire at the end of the day;

This order this is a "willingness matrix" (I'll buy 10 march 100 calls and sell 600 shares or I'll buy 10 march 105 calls and sell 610 shares or I'll buy .... ) and parts of the matrix are displayed to subscribers as and how they request the data. Subscribers can view the data in a volatility matrix or a price matrix or in the case of reversals and conversions in a ROI/ROE matrix (users input cost of carry, leverage, etc., and the system displays the pricing using the assumptions given to the network by the subscriber, thus each subscriber may contemporaneously view the same order and see quite different volatility prices or ROE/ROI pricing. (i.e., to one subscriber the order may be displayed as a volatility bid of 34% and to another, because of a difference cost-of-carry, the same price bid may be 37%. The system is displaying the same order in a manner that is relevant to that specific user), however, the bid foremost in view does not change the order in which the orders are displayed Futures Contracts (options as well)

A futures trader wishes to purchase 10 may S&P contracts and sell 10June S&P contracts for a 5-point credit; he is willing to do so for three hours, and is not willing to allow the system to interact with other networks or exchanges to accomplish the task; if the S&P underlying index moves by more than 20 points, he wants the system to kill the order. This is called a spread bid and provides efficiency to the marketplace so that different contract months will each derive some efficiency from efficiencies in other contracts; another example could easily be derived from a grain elevator company with empty elevators where they would contract to purchase grain (in the market) in May, and simultaneously wish to sell the grain in one or more contract months in the future; they would take delivery, store the grain in the elevator, and make delivery later. In this way, the elevator company can create business (there are implied storage costs in the spreads of commodities)

Risk Arbitrage

A risk arbitrage trader wishes to purchase 25,000 shares of Mobil @ $60 and sell-short 20,000 shares of Exxon @ $80; he wishes the order to expire in 10 minutes, he wants to enter the order (and view the Order Book) from a screen by inputting the ROE bid or ROE offer with the system making the calculation to price from defaults previously input by the user (cost-of-carry, short rebates, expected closing date, delta, expected dividend, etc.); his minimum execution request is 5,000 shares; and he is not willing to allow the system to use other exchanges to attempt to satisfy the request or order.

A table of some of the conditions available for input by subscribers, viewable by other subscribers and executable by the system's trade engine is shown below:

TABLE 1

| Field | Description | Examples |
|---|---|---|
| Type of Order | Buy, Sell, Swap Buy, Swap Sell, Pegged Buy, Pegged Sell: Buy/Sell are fixed price Swap Buy/Sell are variable price and subject to another transaction Pegged Buy/Sell are variable price and variable quantity but not subject to another transaction. | Buy/Sell = Buy 100 IBM for 122¼. Swap Buy/Sell = Buy 100 IBM for 122 and Sell 55 ABC at 40¼ or the economic equivalent thereof. Pegged Buy/Sell = Buy up to 100 IBM at Y where Y is 122 when the current bid for ABC is 40¼ and moves up or down 55 cents per share for each $1 move in the bid price of ABC. |
| Price | Value paid for the security; | 104; or a function having one of the forms in Table 2 |
| Quantity | Maximum Number of securities the subscriber is willing to purchase or sell; | 500,000 principal amount; 20,000 shares; 50 contracts; or a function having one of the forms in Table 3 |
| Minimum Quantity | Minimum number of securities the subscriber is willing to transact in either the first trade or in each trade as the subscriber chooses. | 25,000 principal amount, etc. for each trade; 25,000 principal amount, etc. for the first trade with no minimum being required thereafter. |
| Collar Kill | The order should be cancelled upon an event. The event being the movement of the independent price variable (X) | Cancel the order if the price of XYZ (the secondary security) is above $22/or below $17 per share. |
| Cap (Floor) | The price, Y, above (below) which the subscriber is not willing to enter into a transaction, It is different than the collar because it relates to the primary security in the transaction and not to the underlying security or "independent variable X" and the order continues in a "live" state (not cancelled) | Price = Y = f(x) but not above 105; Price = Y = f(x) but not below 101. The cap will be useful in mitigating the risk of subscribers paying too much in their buy orders, and the floor will be useful in reducing the risk of sellers selling too cheaply. |
| Stealth | The order is not viewable by any other subscribers, but the trade engine should execute a transaction if the conditions are met. | Buy up to 500,000 principal amount of XYZ at Y (where Y is a function) in the event someone independently enters a sell order at a price which is at or below Y and all other conditions are no, but don't allow subscribers to view the order |

TABLE 2

| Convertible Bond Function | $Y = f(x) = (X - PX1) * H\% * CR/F + PY1$, where X is the current price of the underlying security PX1 was the price of the underlying security input by the subscriber as a reference price to the price (PY1) he was willing to pay for the Bond. H % is the hedge ratio as a percentage, is applied to the Conversion Ratio CR, and is divided by a pricing factor F, which in most cases is 10 for domestic convertible bonds and 1 for convertible |
|---|---|

TABLE 2-continued preferred stock. Thus, if the price of the common (X − PX1) moves by 25 cents per share and the conversion ratio is 40 shares per bond, the price Y will move up ½ point from the original price of PY1 if the Hedge Ratio as input by the subscriber entering the order is 50%. The factor of 10 is the conversion of $5.00 (($.25/share) * .5 * 40 share/bond) to ½ of 1% of the face amount (face amount = $1,000). Prices are generally quoted in percent. IOW, a price of 102 would be $1020.00/bond.

What is claimed is:

1. A conditional order transaction network that matches or compares buy and sell orders for a plurality of items based upon conditions set forth within the order, including a price represented as an algorithm with constraints thereon, the conditional order transaction network comprising:

a variable number of trader terminals for entering an order for an item in the form of an algorithm with constraints thereon that represent a willingness to transact, where the price is the dependent variable of the algorithm within the constraints and dynamically changing price of another item is an independent variable, the price as the dependent variable being continuously changeable responsive to changes in price of the independent variable, the algorithm representing a buy or sell order;

controller computer means coupled to each of the trader terminals over a communications network and receiving as inputs, each algorithm with its corresponding constraints;

means for matching, in accordance with the constraints and conditions, algorithmic buy orders with algorithmic sell orders; one of the conditions being the requirement that two or more securities are tradable contemporaneously as a contingent trade of those respective securities, and means for matching or comparing, in accordance with the constraints and conditions, algorithmic buy/sell orders with non-algorithmic sell/buy orders; one of the conditions being the requirement that two or more securities are tradible contemporaneously as a contingent trade of those respective securities, and wherein the order algorithm can be represented as a line in two dimensional space with constraints having the price of one security as one axis and the price of another security as its other axis.

2. The conditional order transaction network of claim 1 further including a plurality of trader workstations for trading and negotiating prospective trades for instruments referenced in buy and sell orders, based upon conditions set forth in the orders including price represented by an algorithm with constraints thereon, each workstation comprising;

a display device for displaying the selected parameters of buy and sell orders in a prioritized sequence in a descending order of favorability across a display field, with the most favorable order at one distal end and the least favorable at the other distal end;

an input device for entering outgoing orders to be traded or negotiated into the trader workstation; and a computer for receiving the outgoing orders and incoming order information from traders' terminals, and for controlling the display device, said computer including, a comparator for comparing all incoming orders relative to outgoing orders, and a sorter that sequences the orders in real-time in the display field as each order is received to reflect changes in the relative favorability of the orders responsive to changes in price of said another item is the independent variable.

3. A conditional order transaction network that electronically matches or compares buy and sell orders for a plurality of items from the same or divers equity markets based upon conditions set fort within the order, including a price represented as an algorithm with constraints thereon, the conditional order transaction network comprising:

a variable number of trader terminals for entering an order for an item in the form of an algorithm with constraints thereon that represent a willingness to transact, where the price is the dependent variable of the algorithm within the constraints and dynamically changing price of another item is an independent variable, the price as a dependent variable being continuously changeable responsive to changes in price of the independent variable, the algorithm representing a buy or sell order;

controller computer means coupled to each of the trader terminals over a communications network and receiving as inputs, each algorithm with its corresponding constraints; and a device for matching or comparing, in accordance with the constraints and conditions, algorithmic buy/sell orders with algorithmic or non-algorithmic sell/buy orders and simultaneously executing a trade of said items in the same or diverse equity markets as a single electronically matched trade.

4. The conditional order transaction network of claim 3 wherein said device for matching and comparing establishes prices at which the buy/sell orders potentially match during a matching cycle; establishes unmatched remainder data at such established prices; searches the external data sources for additional buy and sell data available to match the remainder data; combines the matched remainder data with the potentially matching orders for creating a completed match according to accepted match criteria in order to execute said single electronically matched trade.

5. The conditional order transaction of claim 3 wherein each trader terminal includes:

interface circuitry for transmitting or receiving the algorithmic buy/sell orders including an entire algorithm thereof, or attributes of that algorithm, along said communication link;

a processor for generating orders to be transmitted or analyzing orders received within the terminal independently of algorithm processing within the controller computer means; and a display for displaying, in selectable formats, information representing the algorithmic buy and sell orders.

6. The conditional order transaction network of claim 3, further including a plurality of trader workstations for trading and negotiating prospective trades for instruments referenced in buy end sell orders, based upon conditions set forth in the orders including price represented by an algorithm with constraints thereon, each workstation comprising;

a display device for displaying the selected parameters of buy and sell orders in a prioritized sequence in a descending order of favorability across a display field, with the most favorable order at one distal end and the least favorable at the other distal end;

an input device for entering outgoing orders to be traded or negotiated into the trader workstation; and a computer for receiving the outgoing orders and incoming order information from traders' terminals, and for controlling the display device, said computer including, a comparator for comparing all incoming orders relative to outgoing orders, and a sorter that resequences the orders in real-time in the display field as each order is received to reflect changes in the relative favorability of the orders responsive to changes in price of said another item as is the independent variable.

7. A computer program embodied on a computer-readable medium for matching or comparing buy and sell orders for a plurality of items based upon conditions set forth within the order, including a price represented as an algorithm with constraints thereon, a source code for the program having a plurality of segments comprising:

a segment for processing data from a variable number of trader terminals for entering an order for an item in the form of an algorithm with constraints thereon that represent a willingness to transact, where the price is a dependent variable of the algorithm within the constraints and dynamically changing price of another item is an independent variable, the price as the dependent variable being continuously changeable responsive to changes in price of the independent variable, the algorithm representing a buy or sell order; and a segment for a controlling a computer coupled to each of the trader terminals over a communications network and receiving as inputs, a) each algorithm with its corresponding constraints and b) an external price feed depicting prices of various items and contracts from external multiple data sources which may be used as an independent variable of the algorithm or an input to a constraint variable, the source code further comprising, a segment for matching or comparing, in accordance with the constraints and conditions, algorithmic buy/sell orders with algorithmic or non-algorithmic sell/buy orders through the use of the external multiple data sources, and a segment for simultaneously executing a trade of said items in the same or diverse equity markets as a single electronically matched trade.

8. The computer program of claim wherein said source code further includes a segment for establishing prices at which the buy/sell orders potentially match during a matching cycle; a segment for establishing unmatched remainder data at such established prices; a segment for searching the external data sources for additional buy and sell data available to match the remainder data; a segment for combining the matched remainder data with the potentially matching orders for creating a completed match according to accepted match criteria in order to execute said single electronically matched trade.

9. A computer data signal embodied in a carrier wave having a plurality of source code segments comprising:

a segment for processing data from a variable number of trader terminals for entering an order for an item in the form of an algorithm with constraints thereon that represent a willingness to transact, whom dynamically changing price is a dependent variable of the algorithm within the constraints and price of another item is an independent variable, the price as the dependent variable being continuously changeable responsive to changes in price of the independent variable, the algorithm representing a buy or sell order, and a segment for a controlling a computer coupled to each of the trader terminals over a communications network and receiving as inputs, a) each algorithm with its corresponding constraints and b) an external price feed depicting prices of various items and contracts from external multiple data sources which may be used as an independent variable of the algorithm or an input to a constraint variable, the sources code further comprising, a segment for matching or comparing, in accordance with the constraints and conditions, algorithmic buy/sell orders with algorithmic or non-algorithmic sell/buy orders through the use of the external multiple data sources, and a segment for simultaneously executing a trade of said items in the same or diverse equity markets as a single electronically matched trade.

10. The computer data signal of claim 9 wherein said source code further includes a segment for establishing prices at which the buy/sell orders potentially match during a matching cycle; a segment for establishing unmatched remainder data at such established prices; a segment for searching the external date sources for additional buy and sell data available to match the remainder data; a segment for combining the matched remainder data with the potentially matching orders for creating a completed match according to accepted match criteria in order to execute said single electronically matched trade.

11. A conditional order transaction network that matches or compares buy and sell orders for a plurality of items based upon conditions set forth within the order, including the price represented as an algorithm with constraints thereon, the conditional order transaction network comprising:

a variable number of trader terminals for entering an order for an item in the form of an algorithm with constraints thereon that represent a willingness to transact, where the price is a dependent variable of the algorithm within the constraints and dynamically changing price of another item as an independent variable, the price as the dependent variable being continuously changeable responsive to changes in price of the independent variable, the algorithm representing a buy or sell order;

each trader terminal being programmable by a user to establish a preferred data display format, and translation circuitry for processing different incoming data formats into said preferred format;

controller computer means coupled to each of the trader terminals over a communications network and receiving as inputs, each algorithm with its corresponding constraints; and a device for matching or comparing, in accordance with the constraints and conditions, algorithmic buy/sell orders with algorithmic or non-algorithmic sell/buy orders and simultaneously executing a trade of said items in the same or diverse equity markets as a single electronically matched trade.

12. A conditional order transaction network that electronically matches or compares buy and sell orders for a plurality of items from the same or diverse equity markets based upon conditions set forth within the order, including the represented as an algorithm with constraints thereon, the conditional order transaction network comprising:

a variable number of trader terminals for entering an order for an item in the form of an algorithm with constraints thereon that represent a willingness to transact, where price is the dependent variable of the algorithm within the constraints and dynamically changing price of another item is an independent variable, the price as the dependent variable being continuously changeable responsive to changes in price of the independent variable, the algorithm representing a buy or sell order; and controller computer means coupled to each of the trader terminals over a communications network and receiving as inputs, each algorithm with its corresponding constraints;

means for matching, in accordance with the constraints and conditions, algorithmic or non-algorithmic buy orders with algorithmic or non-algorithmic sell orders, one of the conditions being the requirement that two or more items are tradable contemporaneously as a contingent trade of those respective items; and simultaneously executing a trade of said items in the same or diverse equity markets as a single electronically matched trade responsive to changes in price of said another item is the independent variable.

* * * * *

(12) INTER PARTES REEXAMINATION CERTIFICATE (1293rd)
United States Patent
Nieboer et al.

(10) Number: US 7,024,387 C1
(45) Certificate Issued: *Jun. 28, 2016

(54) AUTOMATED SYSTEM FOR CONDITIONAL ORDER TRANSACTIONS IN SECURITIES OR OTHER ITEMS IN COMMERCE

(75) Inventors: Robert Scott Nieboer, Nashville, TN (US); Pedro V. Balcarce, Antioch, TN (US); Ivan N. Zhidov, Nashville, TN (US); Micah James Eldred, Nashville, TN (US)

(73) Assignee: 5th Market, Inc.

Reexamination Request:
No. 95/002,032, Jul. 2, 2012

Reexamination Certificate for:
Patent No.: 7,024,387
Issued: Apr. 4, 2006
Appl. No.: 09/695,828
Filed: Oct. 26, 2000

(*) Notice: This patent is subject to a terminal disclaimer.

Related U.S. Application Data

(63) Continuation-in-part of application No. 09/359,686, filed on Jul. 23, 1999, now Pat. No. 6,418,419, and a continuation of application No. PCT/US00/19567, filed on Jul. 24, 2000.

(51) Int. Cl.
*G06Q 40/00* (2012.01)
*G06Q 40/04* (2012.01)
*G06Q 50/16* (2012.01)

(52) U.S. Cl.
CPC ............... *G06Q 40/00* (2013.01); *G06Q 40/04* (2013.01); *G06Q 50/16* (2013.01)

(58) Field of Classification Search
None
See application file for complete search history.

(56) References Cited

To view the complete listing of prior art documents cited during the proceeding for Reexamination Control Number 95/002,032, please refer to the USPTO's public Patent Application Information Retrieval (PAIR) system under the Display References tab.

*Primary Examiner* — Jeffrey Carlson

(57) ABSTRACT

An apparatus and method of automatically and anonymously buying and selling positions in fungible properties between subscribers. The specific embodiment described in the disclosure relates to the buying and selling of securities or contracts where the offer to purchase or sell the property may be conditioned upon factors such as the ability to purchase or sell other property or the actual purchase or sale of other property. Specifically, the system described includes methods by which the system will sort and display the information available on each order, methods by which the system will match buy and sell order and attempt to use other markets to effect the execution of transactions without violating conditions set by the subscriber, methods by which the apparatus will execute transaction and report prices to third parties such that the user is satisfied and short sales are reported as prescribed by the rules and regulations of the appropriate regulatory body governing each subscriber in the associated transaction. A communication system is described which allows subscribers to communicate anonymously for the purpose of effecting transactions in such property under such conditions.

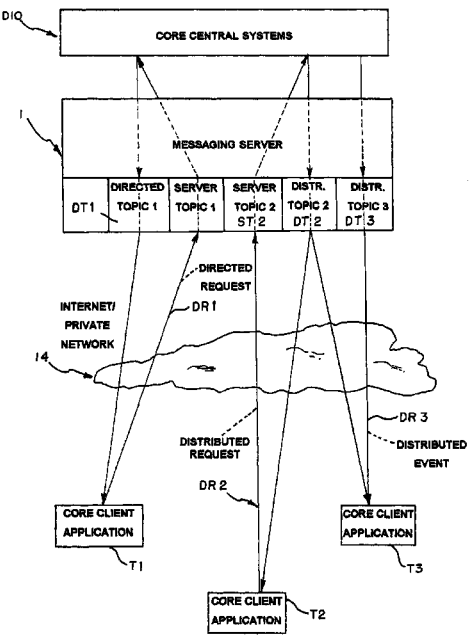

INTER PARTES REEXAMINATION CERTIFICATE

THE PATENT IS HEREBY AMENDED AS INDICATED BELOW.

AS A RESULT OF REEXAMINATION, IT HAS BEEN DETERMINED THAT:

The patentability of claims 1, 4, 8 and 10 is confirmed.

Claims 3, 5, 7, 9, 11 and 12 are cancelled.

Claims 2 and 6 were not reexamined.

\* \* \* \* \*